United States Patent [19]

Guttag et al.

[11] Patent Number: 5,522,082
[45] Date of Patent: May 28, 1996

[54] GRAPHICS DISPLAY PROCESSOR, A GRAPHICS DISPLAY SYSTEM AND A METHOD OF PROCESSING GRAPHICS DATA WITH CONTROL SIGNALS CONNECTED TO A CENTRAL PROCESSING UNIT AND GRAPHICS CIRCUITS

[75] Inventors: Karl M. Guttag; Kevin C. McDonough; Sergio Maggi, all of Houston, Tex.

[73] Assignee: Texas Instruments Incorporated, Dallas, Tex.

[21] Appl. No.: 965,561

[22] Filed: Oct. 23, 1992

Related U.S. Application Data

[63] Continuation of Ser. No. 426,480, Oct. 23, 1989, abandoned, which is a continuation of Ser. No. 346,388, Apr. 27, 1989, abandoned, which is a continuation of Ser. No. 207,034, Jun. 13, 1988, abandoned, which is a continuation of Ser. No. 821,641, Jan. 23, 1986, abandoned.

[51] Int. Cl.[6] ........................................ G06F 9/00
[52] U.S. Cl. ................ 395/800; 395/100; 364/230; 364/228.6; 364/DIG. 1
[58] Field of Search ................... 395/800, 100, 395/325, 775, 425, 375; 364/713, 718, 747, 750, 736, 741

[56] References Cited

U.S. PATENT DOCUMENTS

| | | | |
|---|---|---|---|
| 3,976,982 | 8/1976 | Eiselen | 340/723 |
| 4,087,852 | 5/1978 | Campbell et al. | 364/200 |
| 4,116,444 | 9/1978 | Mayer et al. | 364/521 |
| 4,168,488 | 9/1979 | Evans | 364/521 |
| 4,243,984 | 1/1981 | Ackley et al. | 340/747 |
| 4,247,843 | 1/1981 | Miller et al. | 340/747 |
| 4,262,302 | 4/1981 | Sexton | 358/10 |
| 4,386,410 | 5/1983 | Pandya et al. | 364/521 |
| 4,398,246 | 8/1983 | Frediani et al. | 364/200 |
| 4,467,412 | 8/1984 | Hoff | 364/200 |
| 4,471,464 | 9/1984 | Mayer et al. | 340/725 |
| 4,491,834 | 1/1985 | Oguchi | 340/723 |
| 4,491,907 | 1/1985 | Koeppen et al. | 364/200 |
| 4,510,568 | 4/1985 | Kishi et al. | 364/521 |

(List continued on next page.)

FOREIGN PATENT DOCUMENTS

| | | | |
|---|---|---|---|
| 2566951 | 1/1986 | France | 364/521 |

OTHER PUBLICATIONS

Hall, D. V. "Z80–CPU." In: Microprocessors and Digital Systems (United States of America, McGraw–Hill, Inc. 1980.) pp. 367–369, 413–421.
8–Bit Microprocessor & Peripheral Data, Series C. Texas, Motorola Inc., 1983. pp. (3–469) to (3–493).
NEC Electronics U.S.A. Inc., 1982 Catalog, Microcomputer Division, pp. 515–536, uPD7220/GDC Graphics Display Controller.

*Primary Examiner*—Alyssa H. Bowler
*Assistant Examiner*—Alpesh M. Shah
*Attorney, Agent, or Firm*—Lawrence J. Bassuk; Leo N. Heiting; Richard L. Donaldson

[57] ABSTRACT

The present invention is a programmable data processing system and apparatus which operates as an independent microprocessor. The programmable data processing system of the present invention stores both general purpose and special purpose graphic instructions. The programmable data processing apparatus of the present invention has both types of instructions within its instruction set. This provision of a single processing apparatus for preforming both types of instructions enables a highly flexible solution to bit map graphics problems. This is because the program of the data processing apparatus may be altered to provide the most desirable graphics algorithm without loss of the general purpose calculation and program flow capability of a general purpose data processor. The data processor of the present invention may serve as a parallel processor for a host data processing system for primarily control of bit mapped graphics. In addition this same type data processing apparatus may serve as an independent microprocessor within a single user computer or graphics terminal.

35 Claims, 14 Drawing Sheets

U.S. PATENT DOCUMENTS

| | | | |
|---|---|---|---|
| 4,517,654 | 5/1985 | Carmean | 340/726 |
| 4,528,636 | 7/1985 | Robinson, III | 364/521 |
| 4,570,158 | 2/1986 | Bleich et al. | 340/723 |
| 4,608,656 | 8/1986 | Tanaka et al. | 364/521 |
| 4,609,917 | 9/1986 | Shen | 364/521 |
| 4,626,839 | 12/1986 | O'Malley | 340/723 |
| 4,636,945 | 1/1987 | Tanagawa et al. | 395/550 |
| 4,644,503 | 2/1987 | Bantz et al. | 364/521 |
| 4,779,210 | 10/1988 | Katsura et al. | 364/521 |
| 4,799,146 | 1/1989 | Chauvel | 395/325 |
| 4,860,218 | 8/1989 | Sleator | 364/518 |
| 4,862,150 | 8/1989 | Katsura et al. | 340/703 |
| 4,961,072 | 10/1990 | Sekikawa | 340/731 |

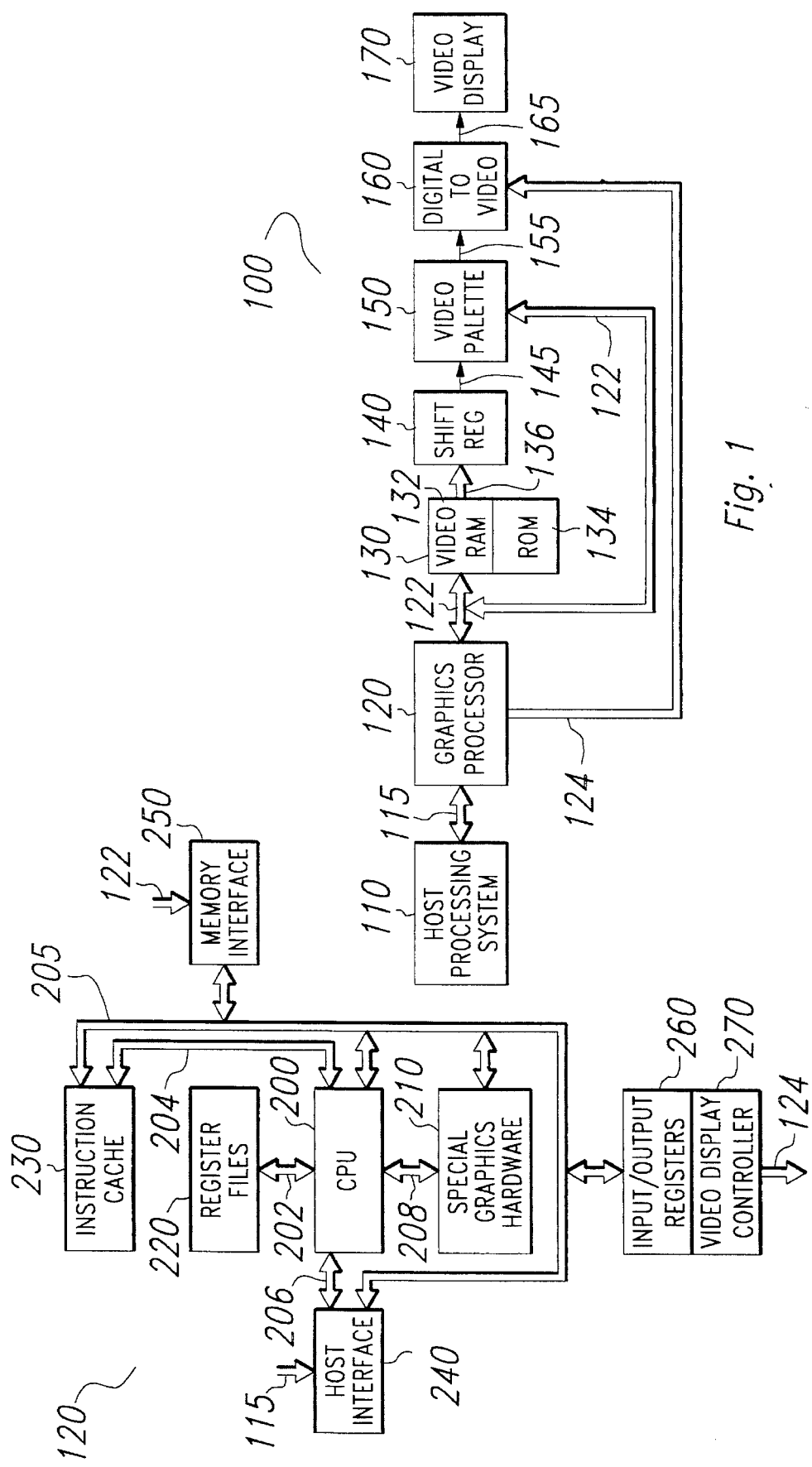

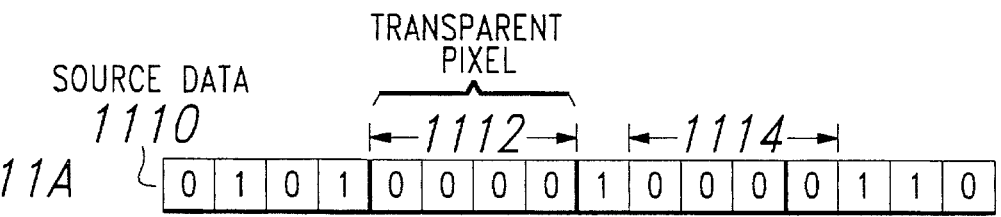
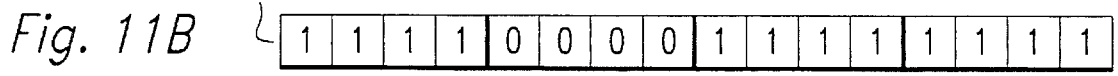
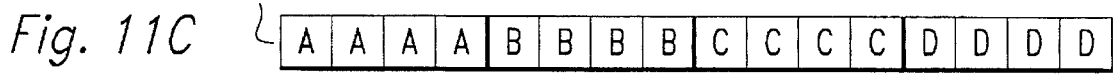
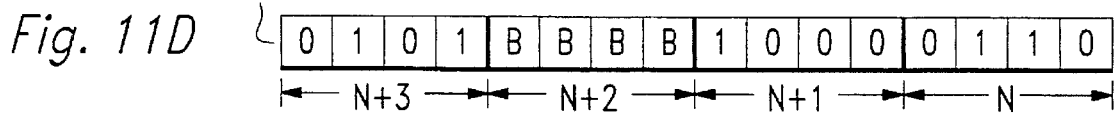
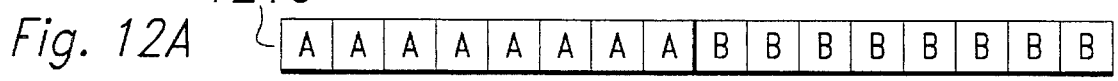
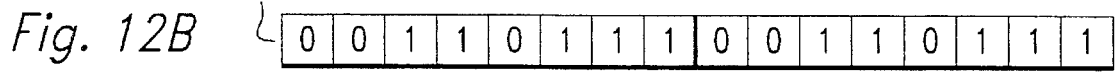
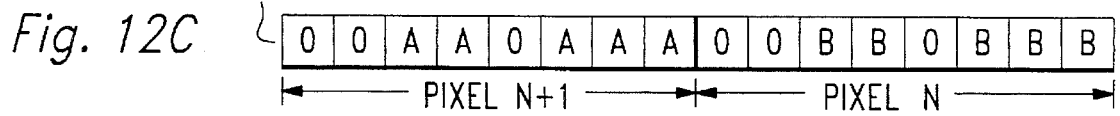

16 BIT DATAWORD, TWO 8-BIT PIXELS
DESTINATION DATA TO BE ALTERED
1310
Fig. 13A  | A | A | A | A | A | A | A | A | B | B | B | B | B | B | B | B |
SOURCE PIXELS TO BE MOVED
1320
Fig. 13B  | Y | Y | Y | Y | Y | 0 | 0 | 0 | Z | Z | Z | Z | Z | Z | Z | Z |
PLANE MASK
1330
Fig. 13C  | 0 | 0 | 0 | 0 | 0 | 1 | 1 | 1 | 0 | 0 | 0 | 0 | 0 | 1 | 1 | 1 |
RESULTANT MASKED SOURCE DATA
1340
Fig. 13D  | 0 | 0 | 0 | 0 | 0 | 0 | 0 | 0 | 0 | 0 | 0 | 0 | 0 | Z | Z | Z |
TRANSPARENCY MASK
1350
Fig. 13E  | 0 | 0 | 0 | 0 | 0 | 0 | 0 | 0 | 1 | 1 | 1 | 1 | 1 | 1 | 1 | 1 |
COMBINED PLANE AND TRANSPARENCY MASK
1360
Fig. 13F  | 0 | 0 | 0 | 0 | 0 | 0 | 0 | 0 | 0 | 0 | 0 | 0 | 0 | 1 | 1 | 1 |
RESULTANT DESTINATION DATA
1370
Fig. 13G  | A | A | A | A | A | A | A | A | B | B | B | B | B | Z | Z | Z |

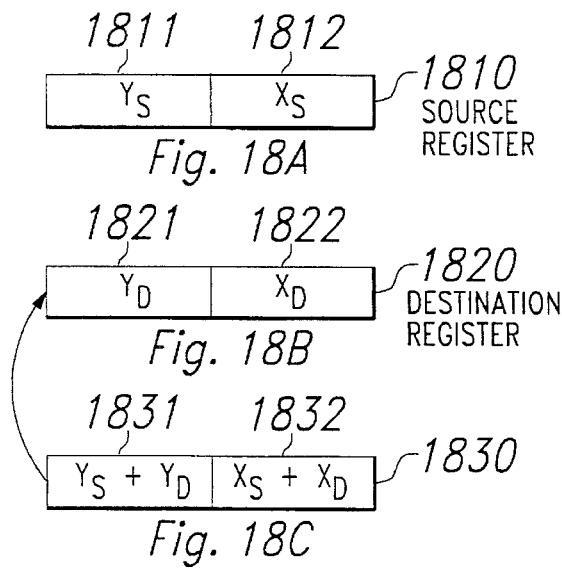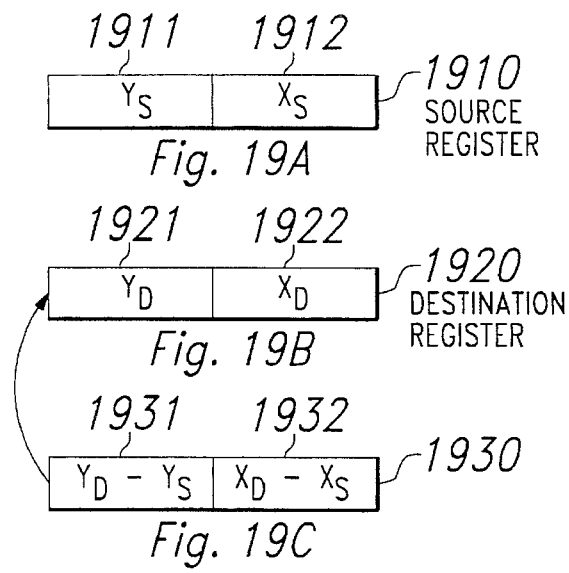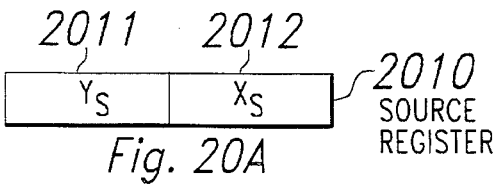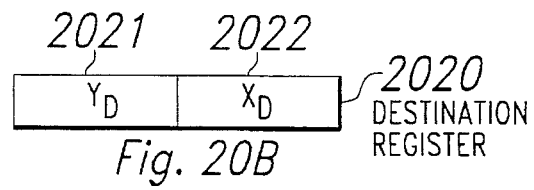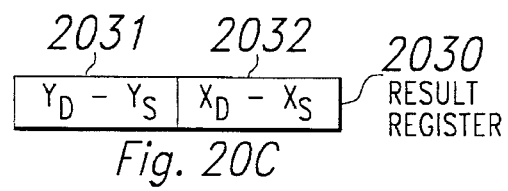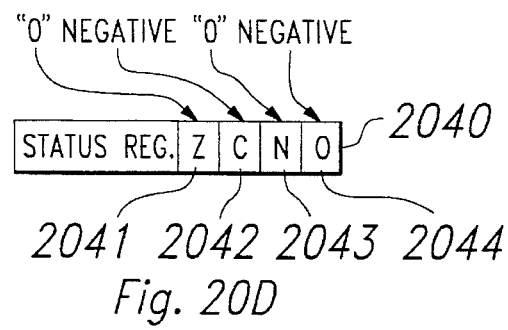

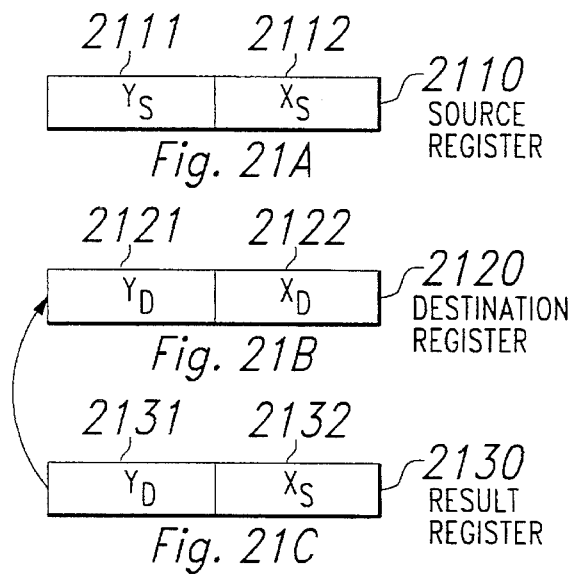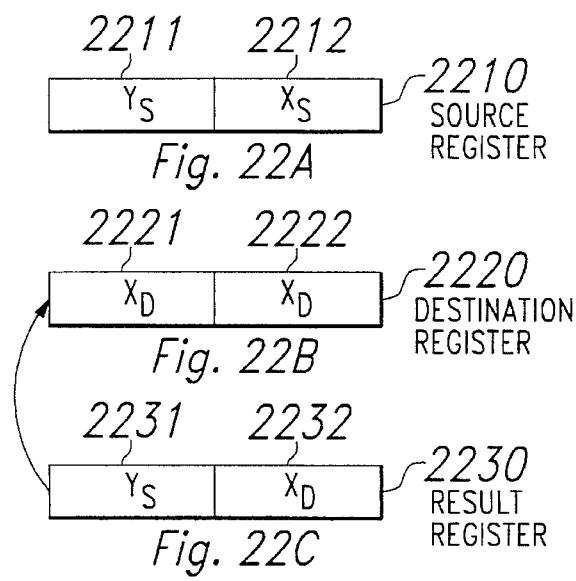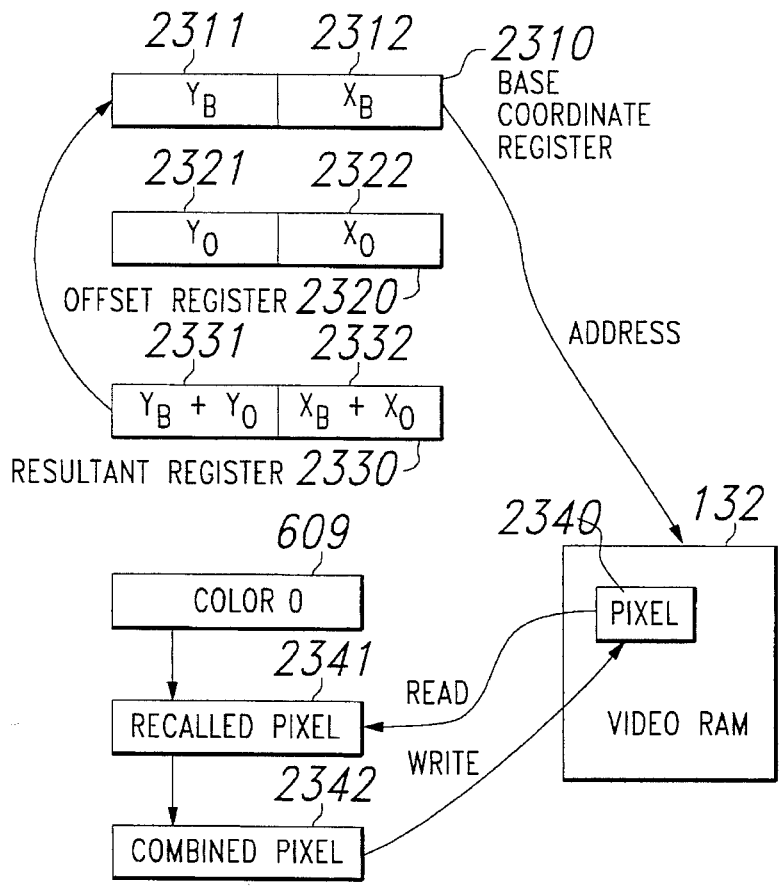

GRAPHICS DISPLAY PROCESSOR, A GRAPHICS DISPLAY SYSTEM AND A METHOD OF PROCESSING GRAPHICS DATA WITH CONTROL SIGNALS CONNECTED TO A CENTRAL PROCESSING UNIT AND GRAPHICS CIRCUITS

The present application is related to U.S. patent application Ser. No. 790,299 filed Oct. 22, 1985, entitled "Graphics Data Processing Apparatus Having Pixel to Window Compare Capability" by Karl M. Guttag, Michael D. Asal and Mark F. Novak, U.S. patent application Ser. No. 790,293 filed Oct. 22, 1985, entitled "Logic Circuit for a Pixel to Window Compare Capability" by Richard Simpson and Dyson Wilkes, U.S. patent application Ser. No. 795,158 filed Nov. 5, 1985, entitled "Graphics Data Processing Apparatus for Graphic Image Operations upon Data of Independently Selectable Pitch" by Karl M. Guttag, Michael D. Asal and Mark F. Novak, U.S. patent application Ser. No. 795,380 filed Nov. 6, 1985, entitled "Linked Cell Discharge Detector Having Improved Response Time" by Mohammed N. Maan, U.S. patent application Ser. No. 795,383 filed Nov. 6, 1985, entitled "Graphics Processing Apparatus Having Color Expand Operation for Drawing Color Graphics from Monochrome Data" by Karl M. Guttag, Michael D. Asal and Mark F. Novak, U.S. patent application Ser. No. 795,382 filed Nov. 6, 1985, entitled "Graphics Data Processing Apparatus Having Image Operations with Transparent Color Having a Selectable Number of Bits" by Karl M. Guttag, Michael D. Asal and Thomas Preston, U.S. patent application Ser. No. 804,204 filed Dec. 3, 11985, entitled "Graphics Processing Apparatus Having Instruction which Operates Separately on X and Y Coordinated of Pixel Location Registers" by Karl M. Guttag, Michael D. Asal, Neil Tebbutt and Mark F. Novak, U.S. patent application Ser. No. 804,203 filed Dec. 3, 1985, entitled "Graphics Data Processing Apparatus with Draw and Advance Operation" by Karl M. Guttag, Michael D. Asal, Neil Tebbutt, Jerry R. Van Aken and Mark F. Novak, U.S. patent application Ser. No. 821,375 filed Jan. 22, 1985, entitled "Data Processing System with Variable Memory Bank Selection" by Andrew Heilveil, U.S. patent application Ser. No. 821,634 filed Jan. 23, 1985, entitled "Data Processing Apparatus and System Having Memory Accesses on Selectably Variable Field Sizes" by Michael D. Asal, Karl M. Guttag, Jerry R. Van Aken, Neil Tebbutt and Mark F. Novak, U.S. patent application Ser. No. 821,644 filed Jan. 23, 1985, entitled "Memory Access Controller Having Variable Priority" by Thomas Preston, Michael D. Asal and Karl M. Guttag and U.S. patent application Ser. No. 821,667 filed Jan. 23, 1985, entitled "Graphics Data Processing Apparatus Having Nonlinear Saturating Operations on Multibit Color Data" by Karl M. Guttag, Michael D. Asal and Mark F. Novak. This application is a continuation application of Ser. No. 07/426,480 filed Oct. 23, 1989 now abandoned; which is a continuation application Ser. No. 07/346,388 filed Apr. 27, 1989, abandoned; which is a continuation application Ser. No. 07/207/834 filed Jun. 13, 1988, abandoned; which is a continuation application Ser. No. 06/821,641 filed Jan. 23, 1986, abandoned.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefited greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BIT-BLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

SUMMARY OF THE INVENTION

The present invention attempts to solve some of the problems inherent in the prior art hardwired bit map graphic controllers by providing a more flexible graphics data processor. In accordance with the present invention a graphics data processor is provided which can execute both general purpose data processing instructions and special purpose graphics data processing instructions. The graphics data processor of the present invention is provided with special purpose graphics hardware particularly adapted to data processing tasks required by bit mapped graphics displays.

One of the central features of the graphics data processor of the present invention is programmability. In accordance with the present invention the graphics data processor can perform general purpose data processing tasks and special graphics data processing tasks in response to a single set of program instructions without any required intervention by another processor. The general purpose data processing tasks would typically include register arithmetic and logic operations, memory access operations and program flow control operations. Program flow control operations include conditional and unconditional branch operations, subroutine calls and subroutine returns. The graphics operations would include at least the capability to perform pixel array moves for transferring an array of pixels to a specified location in the bit map. These pixel array moves preferably also include the capability to perform a specified combination between corresponding pixels of a source array and a destination array. This source destination combination may be subject to transparency and plane masking.

These features and other features described in the present application enable a highly flexible solution to the problem of controlling bit mapped graphics. The capability for a single program to provide for both general purpose data processing and graphic processing is an advance over the prior art which required such functions to be separate.

BRIEF DESCRIPTION OF THE DRAWINGS

These and other objects of the present invention will be readily understood from the following description, taken in conjunction with the drawings in which:

FIG. 1 illustrates a block diagram of a computer with graphics capability constructed in accordance with the principles of the present invention;

FIG. 2 illustrates the block diagram of a preferred embodiment of the graphics processing circuit of the present invention;

FIG. 11 illustrates an example of the use of transparency;

FIG. 12 illustrates an example of the use of plane masking;

FIG. 13 illustrates an example of the combined use of transparency and plane masking;

FIG. 18 illustrates diagrammatically the operation of the add registers instruction in the X Y coordinate mode;

FIG. 19 illustrates diagrammatically the operation of the subtract registers instruction in the X Y coordinate mode;

FIG. 20 illustrates diagrammatically the operation of the compare registers instruction in the X Y coordinate mode;

FIG. 21 illustrates diagrammatically the operation of the move X coordinate instruction;

FIG. 22 illustrates diagrammatically the operation of the move Y coordinate instruction;

FIG. 23 illustrates diagrammatically the operation of the draw and advance instruction.

DETAILED DESCRIPTION OF THE PREFERRED EMBODIMENT

Figure 3:
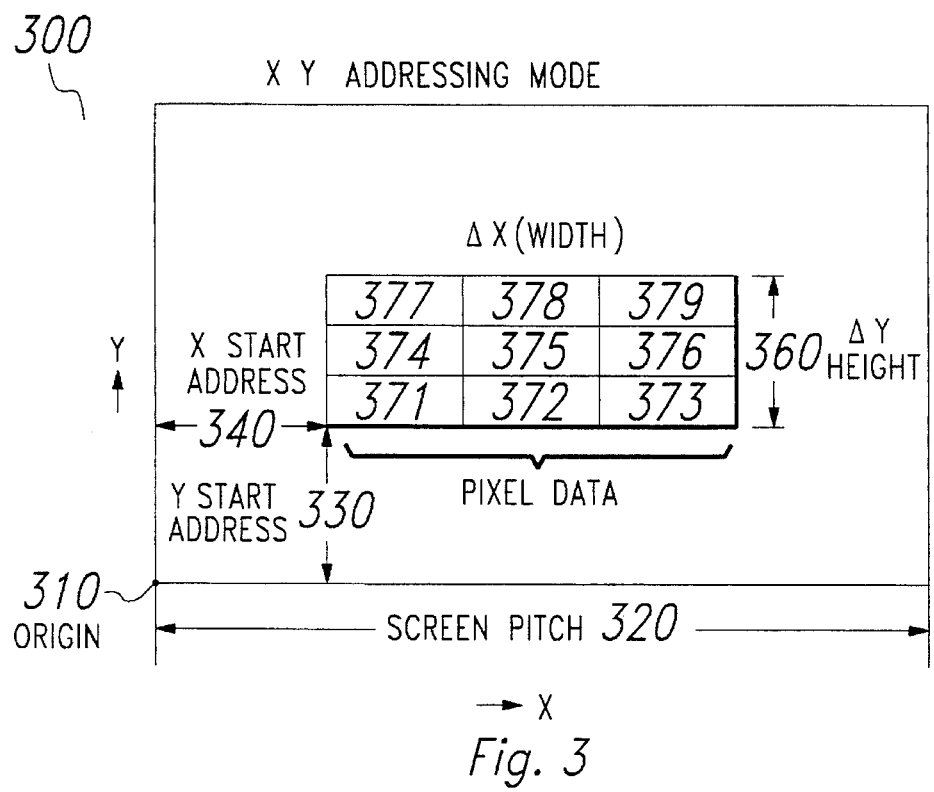
FIG. 3 illustrates the manner of specifying individual pixel addresses within the bit mapped memory in accordance with the X Y addressing technique.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 120 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 132 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit, in addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to major bus 205 and may be loaded with instruction words from the memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 4:
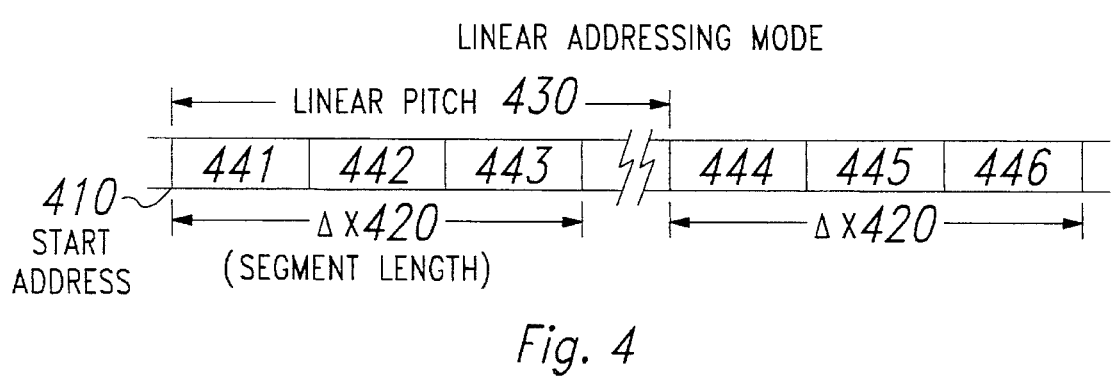
FIG. 4 illustrates a manner of specifying field addresses in accordance with the linear addressing technique.
Figure 5A:
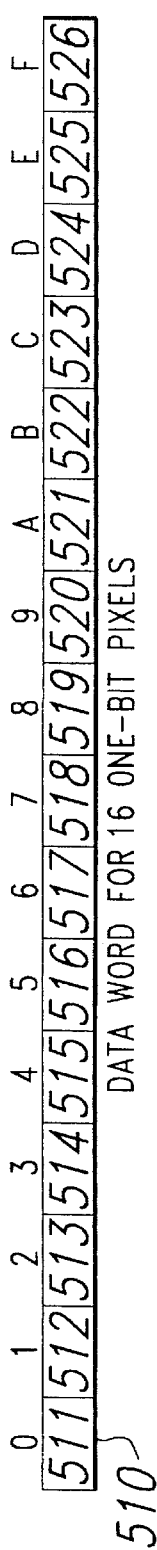
FIG. 5 illustrates the preferred embodiment of storage of pixel data of varying lengths within a single data word in accordance with the preferred embodiment of the present invention.
Figure 5B:
Figure 5C:
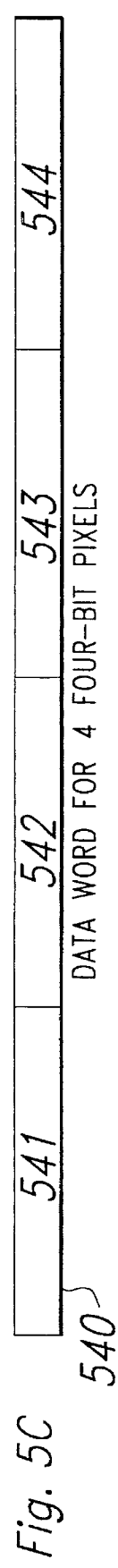
Figure 5D:
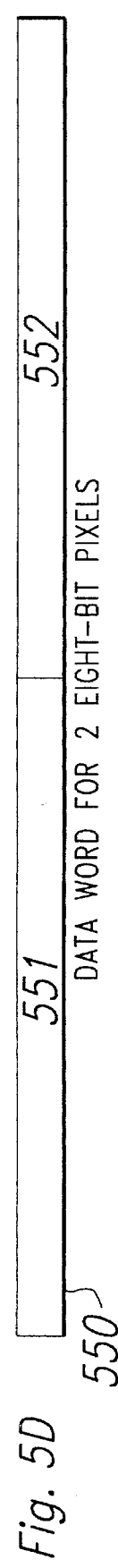
Figure 5E:
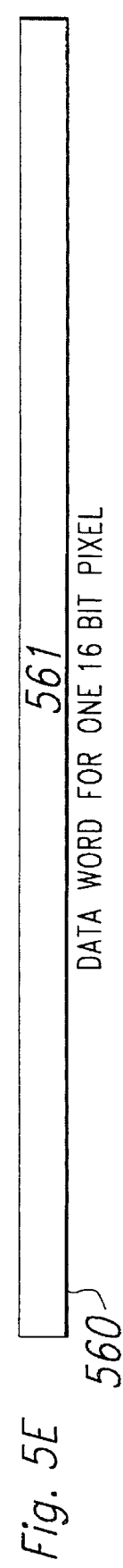

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 320 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed this latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

Where: LA is the linear address; OFF is the screen offset, the linear address of the origin of the X Y coordinate system; Y is the Y address; SP is the screen pitch in bits; X is the X address; and PS is the pixel size in bits. Regardless of which addressing mode is employed, memory interface 250 generates the proper physical address for access to memory 130.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through f. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 526 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
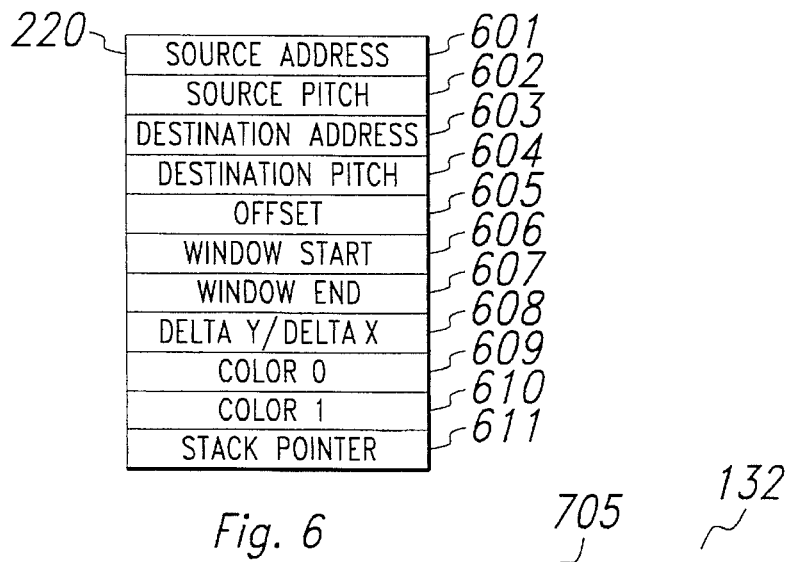
FIG. 6 illustrates the arrangement of contents of implied operands stored within the register memory in accordance with the preferred embodiment of the present invention.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 320 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destination start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
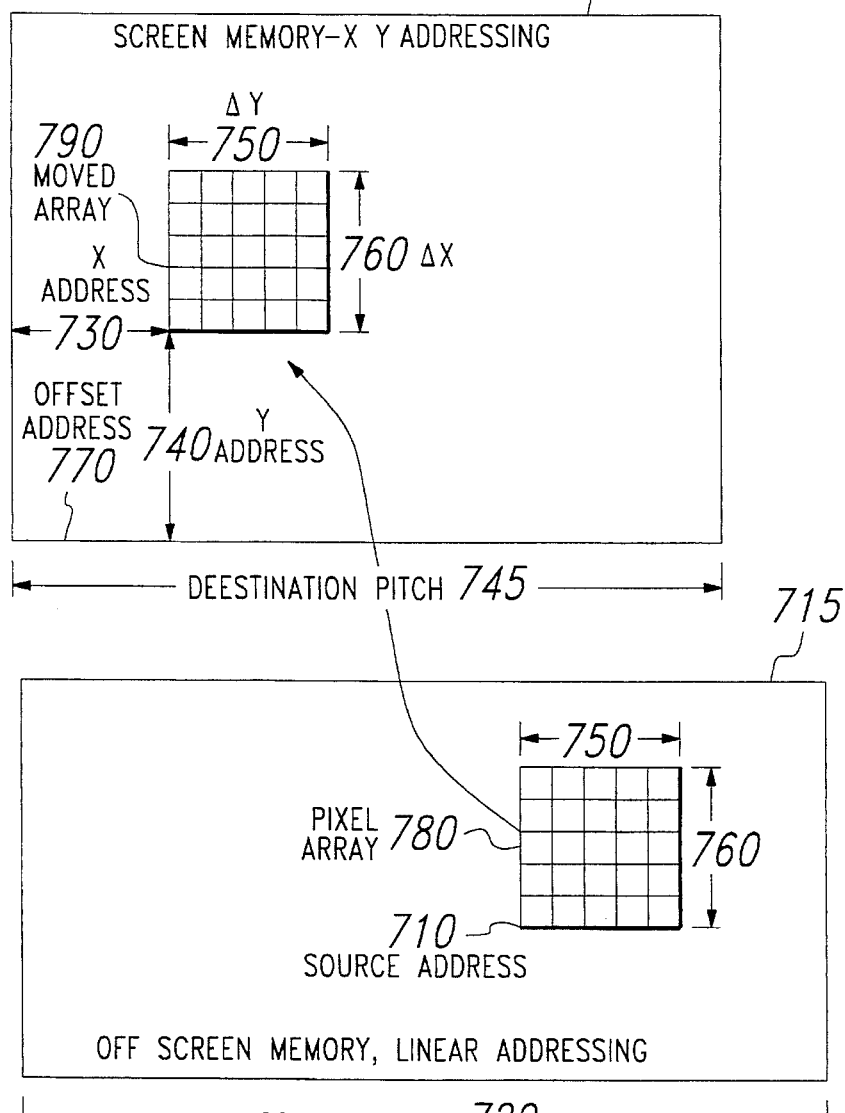
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 45 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
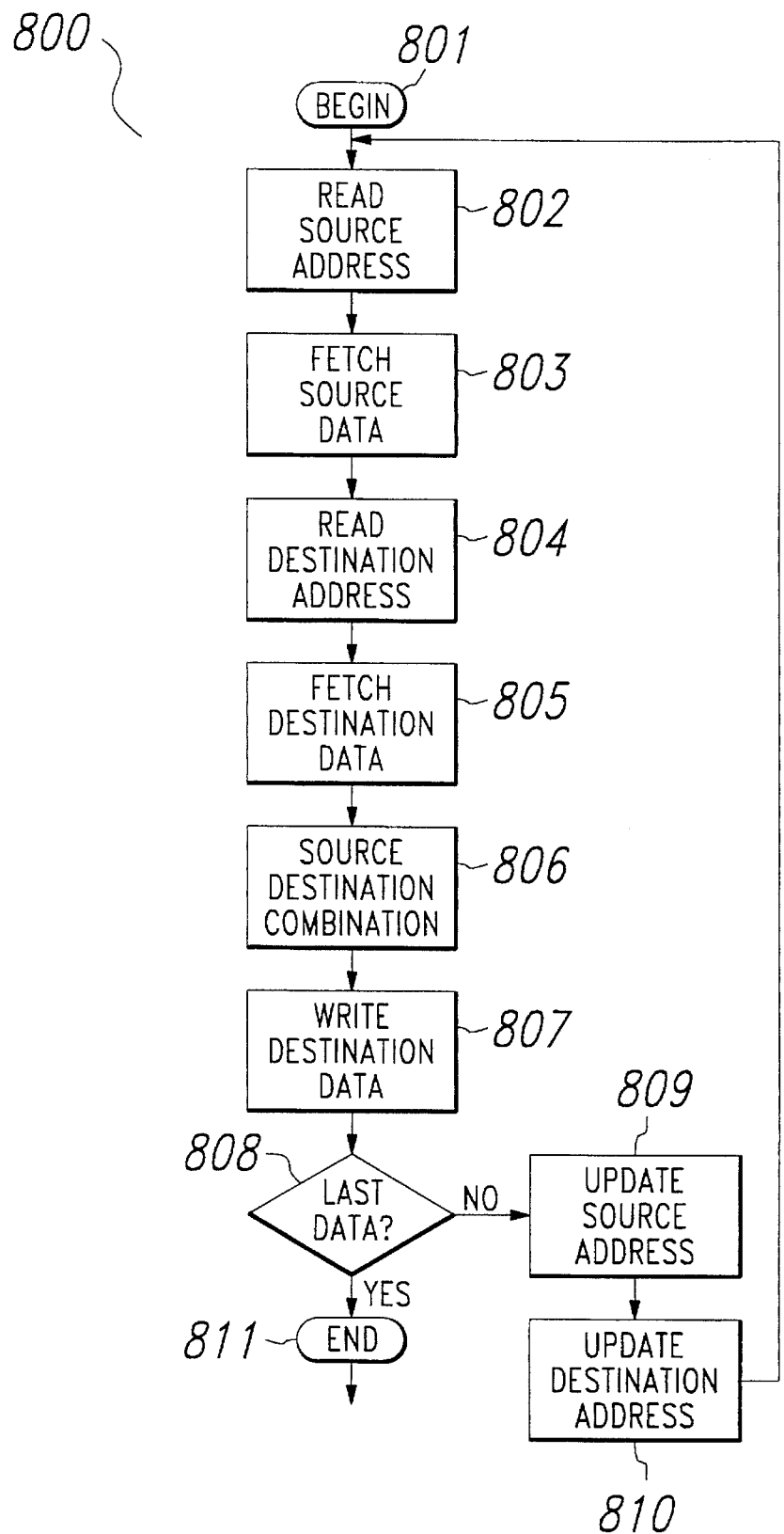
FIG. 8 illustrates a flow chart of a bit block transfer or array move operation in accordance with the present invention.

This process is illustrated by the flow chart 800 in FIG. 8. In accordance with the preferred embodiment the transfer takes place sequentially by physical data words. Once the process begins (begin block 801) the data stored in the register 601 is read to obtain the source address (processing block 802). Next graphics processor 120 fetches the indicated physical data word from memory 130 corresponding to the indicated source address (processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810).

This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

Figure 9:
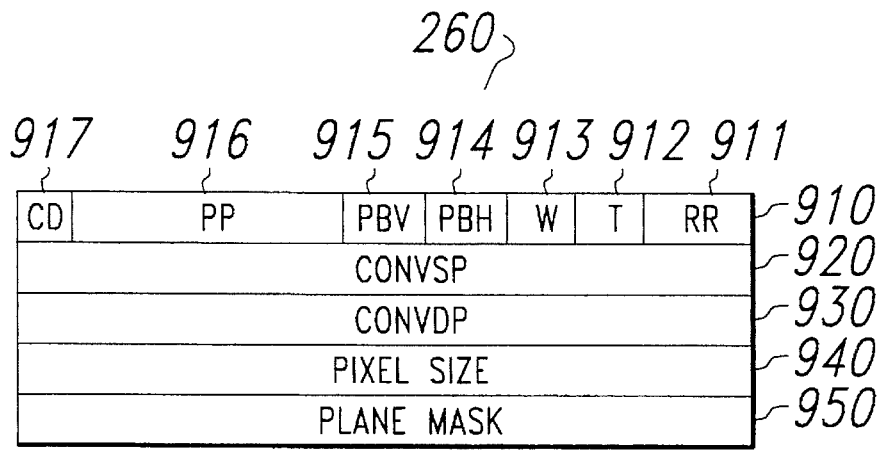
FIG. 9 illustrates some of the input/output registers of the graphics data processor of the present invention.

FIG. 9 illustrates a portion of input/output registers 260 which is employed to store data relevant to the transparency operations of the present invention. Firstly, input/output registers 260 includes a register 910 which stores a control word. This control word is used to specify types of operations performed by central processing unit 210. The control word stored in register 910 includes a refresh rate section 911, transparency enable/disable section 912, a windowing option section 913, a pixel block horizontal direction control section 914, a pixel block transfer vertical direction control section 915, a pixel processing section 916 and a cache enable/disable section 917. The purpose and effect of these sections of the control word will be described below.

The refresh rate portion 911 is two bits which define the refresh rate of the dynamic random access memory forming video RAN 132. Table 1 illustrates the preferred embodiment of this refresh rate portion 911. Note that the dynamic random access memory may be updated once each 32 or 64 instructions cycles of graphics processor 120, or refresh may be suspended depending upon the state of this bits. The particular refresh rate selected depends upon the application to which the graphics processor 120 is adapted. It should be noted, however, that the no refresh option should not be set for more than a short period of time in order to ensure the integrity of data stored within memory 130.

TABLE 1

| RR | Bits | Refresh Rate |
|---|---|---|
| 0 | 0 | 32 Clock Cycles |
| 0 | 1 | 64 Clock Cycles |
| 1 | 0 | Unused |
| 1 | 1 | No DRAM Refresh |

A single bit within register 910 is used to indicate whether or not the transparency operation is enabled. This single bit is the transparency enable/disable section 912. If this bit is "1" then transparency is enabled. In such a case the special graphics hardware 210 tests for source pixels which are transparent. In the preferred embodiment these pixels are all "0's". If such pixels are detected then the corresponding destination pixel is unchanged regardless of the source destination combination selected. If this bit is "0", then transparency is disabled. In such an event, the source destination combination is formed for transparent pixels in a manner like any other pixel. Thus by proper setting or resetting of this particular bit within register 910, the transparency operation may be enabled or disabled.

Control register 910 includes a window violation control portion 913. This window violation control portion includes two bits. Depending upon the state of these two bits graphics processor 120 performs differing windowing function. These differing windowing functions are implied in the case of an array move such as illustrated in FIG. 8. If these two windowing function bits are "00" then no windowing takes place. If these windowing violation P bits are "10", then an interrupt is generated if a window violation occurs. In this case, the source pixel is moved to its destination only if it lies within the window defined by the window start and window end data stored within register files 220. If the destination is outside of the window, then an interrupt is generated and the array move is aborted. Lastly, if the window violation bits are "11", then a windowed move occurs. The source pixel is moved only if its destination lies within the window. If the destination lies outside the window, then that particular pixel move is aborted. However, other pixels within the same array move will be transferred normally, if their destinations are within the window. Thus, in the array move the destination is truncated to fit within the window and only those pixels within the window are transferred. Table 2 is a summary of the window violation control codes.

TABLE 2

| W | Bits | Windowing Action |
|---|---|---|
| 0 | 0 | Windowing Disabled |
| 0 | 1 | Unused |
| 1 | 0 | Interrupt on Window Violation |
| 1 | 1 | Inhibit Pixel Write on Window Violation Other Pixels Unaffected |

Register 910 includes sections 914 and 915 which indicate the direction of movement of the pixel block transfer operation. Section 914 stores the pixel block transfer horizontal control bit (PBH) which sets the direction of horizontal movement. If the pixel block transfer horizontal control bit is "0" then the X coordinate is incremented. This corresponds to movement from left to right. If the pixel block transfer horizontal control bit is "1" then the X coordinate is decremented causing movement from right to left. Section 915 stores the pixel block transfer vertical control bit (PBV) which indicates the direction of vertical movement. This is defined similarly to the horizontal control. A "0" causes the Y coordinate to be incremented causing movement from top to bottom. A "1" causes the Y coordinate to be decremented causing movement from bottom to top.

Pixel processing section 916 within the control word stored in register 910 specifies the type of source destination combination performed during array moves. As noted in regards to FIG. 8 and in particular to processing block 806, this combination of source and pixel data may include various logic and arithmetic functions. The relationship between the state of the pixel processing section 911 and the source destination combination performed during a pixel array move is shown in Table 3.

TABLE 3

| PP | Operation | Description |
|---|---|---|
| | Logical Combinations | |
| 00000 | S → D | Replace Destination with Source |
| 00001 | D AND S → D | AND Source with Destination |
| 00010 | D- AND S → D | AND Source with NOT Destination |
| 00011 | 0 → D | Replace Destination with zeros |
| 00100 | D XOR S- → D | XOR NOT Source with Destination |
| 00101 | D AND S- → D | AND NOT Source with Destination |
| 00110 | D- → D | Negate Destination |
| 00111 | D NOR S → D | NOR Source with Destination |

TABLE 3-continued

| PP | Operation | Description |
|---|---|---|
| 01000 | D OR S → D | OR Source with Destination |
| 01001 | 0 → D | No operation |
| 01010 | D XOR S → D | XOR Source with Destination |
| 01011 | D AND S- → D | AND NOT Source with Destination |
| 01100 | 1 → D | Replace Destination with ones |
| 01101 | D OR S- → D | OR NOT Source with Destination |
| 01110 | D NAND S → D | NAND Source with Destination |
| 01111 | S- → D | Replace Destination with NOT Source |
| | Arithmetic Combinations | |
| 10000 | D + S → D | Add Source to Destination |
| 10001 | ADDS(D,S) → D | Add S to D with Saturation |
| 10010 | D − S → D | Subtract Source from Destination |
| 10011 | SUBS(D,S) → D | Subtract S from D with Saturation |
| 10100 | MAX(D,S) → D | Maximum of Source and Destination |
| 10101 | MIN(D,S) → D | Minimum of Source and Destination |

The last section of register 910 stores the cache enable/disable bit 917. If this bit is "0" then the instruction cache 230 is enabled. If an instruction is already loaded in the cache then it is executed from the cache without reading the requested instruction from memory 130. If the instruction is not in the cache, then that instruction together with the next three instructions are fetched from memory 130 and stored in instruction cache 230. This operation is controlled by memory interface 250 and occurs without the direct control of central processing unit 200. On the other hand, if the cache enable/disable bit is "1", then the instruction cache is disabled. In that case each requested instruction is individually recalled from memory 130 when requested.

Registers 920 and 930 are employed to store data which is useful in converting between X Y and linear addresses. CONVSP data stored in register 920 is a precalculated factor employed to enable conversion from X Y addressing to linear addressing for screen pitch. This factor is:

$$16 + \log_2(\text{screen pitch})$$

In a similar fashion, the data CONVLP stored in register 930 is employed for conversion between X Y addressing and linear addressing for the linear pitch. This data corresponds to:

$$16 + \log_2(\text{linear pitch})$$

Storing this data in registers 920 and 930 in this manner enables central processing unit 200 to readily access this data in order to quickly implement the conversions between X Y addressing and linear addressing.

Register 940 has the pixel size data stored therein. The pixel size data indicates the number of bits per pixel within the displayable portion of video RAM 132. As previously noted in conjunction with FIG. 5, the pixel size is constrained by the preferred word size. In the preferred embodiment, the graphics processor of the present invention operates on 16 bit data words. The number of bits per pixel is constrained in the preferred embodiment to be an integral factor of 16, the number of bits per word. Thus, the number of bits per word could be one, two, four, eight or sixteen. Register 940 stores pixel size data which equals the number of bits per word selected. Thus, if a single bit per word has been selected, register 940 stores the numerical data 1. Similarly, if two-bit per pixel has been selected, then register 940 stores numerical data equal to 2. Likewise, other possible numbers of bits per pixel are indicated by the numeric values stored within register 940. This pixel size data is employed by central processing unit 200 and special graphics hardware 210 in executing various instructions, in particular the transparency operation to be discussed further below.

Register 950 stores a plane priority mask which is employed in raster operations. Register 950 stores a bit mask which defines which portions of each pixel color code are to be actively modified during an array move operation such as illustrated FIG. 8. In the preferred embodiment the number of bits per pixel, i.e. the pixel size, is limited to an integral fraction of the physical data word employed by the graphics data processing apparatus. Therefore register 950 includes an integral number of sets of bits equal to the pixel size. In accordance with the preferred embodiment, register 950 includes the plane mask, which is equal in length to the pixel size, replicated throughout the register. In the plane mask "1" bits correspond to bits within the pixel color code which are to be written into the destination location and "0" bits correspond to bits which are to be unchanged in the destination location. This permits only part of the pixel color code to be modified by a raster operation. This feature is useful when the pixel color codes represent a number of separable attributes, such as red, blue and green color intensities. Plane masking can be disabled by setting register 950 to all "1's" thereby assuring that all pixels of the destination are affected.

Figure 10:
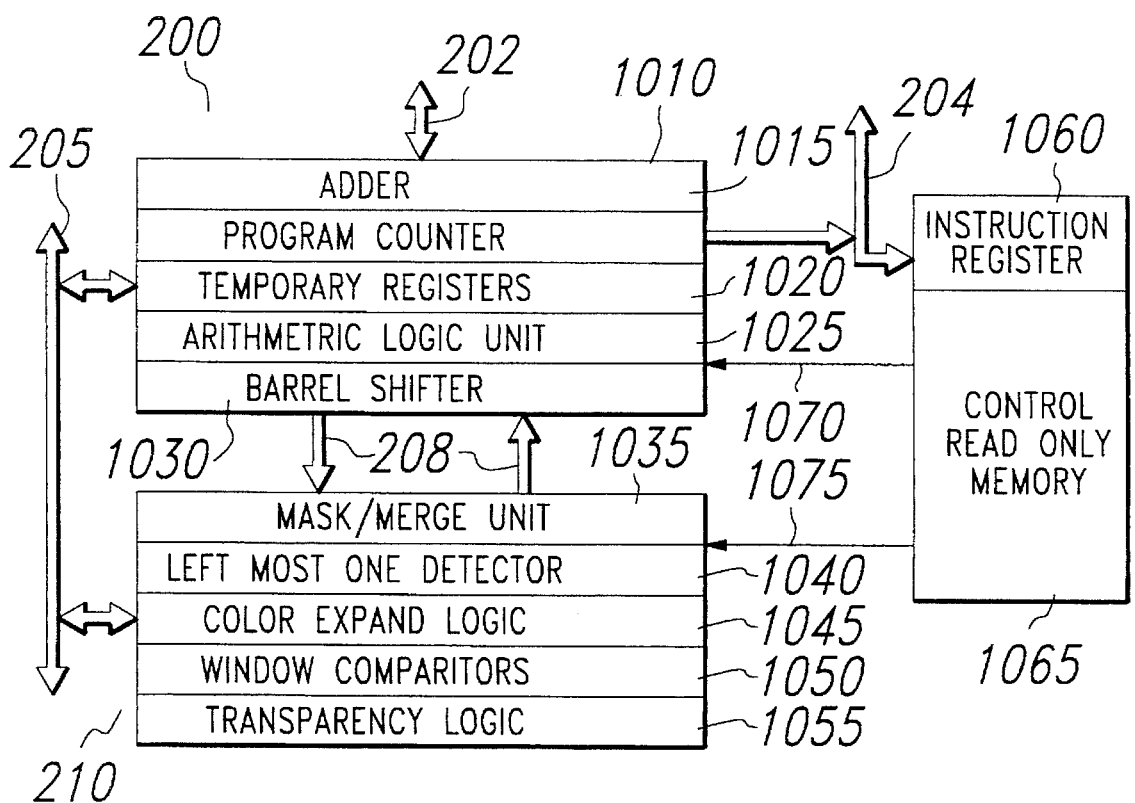
FIG. 10 illustrates further details of the central processing unit and the special graphics hardware of the graphics data processor of the present invention.

FIG. 10 illustrates in somewhat greater detail the structure and interrelationship between central processing unit 200 and special graphics hardware 210. As previously illustrated in FIG. 2, central processing unit 200 and special graphics hardware 210 are bidirectionally coupled via bus 208. Central processing unit 200 and special graphics hardware 210 are bidirectionally coupled to major bus 205. In addition, FIG. 10 illustrates central processing unit 200 connected to bus 202 which is further coupled to the register files 220 and to bus 204 which is further coupled to instruction cache 230.

FIG. 10 illustrates that central processing unit 200 includes adder 1010, program counter 1015, temporary registers 1020, arithmetic logic unit 1025 and barrel shifter 1030. These elements are conventional in character, corresponding to elements employed in central processing units known in the prior art.

FIG. 10 illustrates various subparts of special graphics hardware 210. Special graphics hardware 210 includes mask/merge unit 1035, left most one detector 1040, color expand logic 1045, window comparators 1050 and transparency logic 1055. These individual portions of special graphics hardware 210 are particularly adapted for manipulation of pixel information within video random access memory 132. The operation of each of these units will be more fully described below.

FIG. 10 also illustrates instruction register 1060 and control read only memory 1065. Instruction register 1060 receives an instruction from instruction cache 230 via bus 204. The particular instruction recalled for storage in instruction register 1060 is specified by the address stored in program counter 1015. Whether this instruction must be recalled from memory 130 via memory interface 250 or it is already stored within instruction cache 230, this instruction is stored in the instruction register 1060. The instruction stored instruction register 1060 activates control read only memory 1065 to output a plurality of control signals corresponding to the particular instruction being executed. Thus control read only memory 1065 performs the function of an instruction decoder. The control signals are applied to central processing unit 200 via control bus 1070 and to special graphics hardware 210 via control bus 1075. It is contemplated that some instructions which may be stored in instruction register 1060 for implementation via control read only memory 1065 may require only some of the resources of central processing unit 200 or special graphics hardware 210. However, no distinction is made in the instruction itself or in the control signals stored within control read only memory 1065. In any case of an instruction being received by graphics processor 120, it is loaded into instruction register 1060 for implementation via control signals on control buses 1070 and 1075 derived from control read only memory 1065. It is contemplated that in some cases cooperation between central processing unit 200 and special graphics hardware 210 will be required in order to implement a single instruction. This is to be expected in the same manner in which several portions of central processing unit 200 would ordinarily be required to implement any instruction directed solely to the resources of central processing unit 200.

FIGS. 11, 12 and 13 illustrate the operation of transparency and plane masking in accordance with the preferred embodiment of the present invention. The masking and merging required for these functions occurs in mask/merge unit 1035 of special graphics hardware 210. The detection of transparent pixels occurs in transparency logic 1055 of special graphic hardware 210.

Graphics processor 120 of the present invention contemplates the employment of special transparent pixels whose insertion into video random access memory 132 does not alter the prior contents of this memory. FIG. 11 illustrates the operation of transparency which is employed during a pixel array move operation.

FIG. 11 illustrates 16 bit words which include pixels N, N+1, N+2 and N+3, each pixel having 4 bits. The data to be written into the destination location is illustrated at 1110. This data includes a single transparent pixel 1112. Also included in the source data 1110 is a set of 4 consecutive bits 1114 equal in length to the pixel size crossing a pixel boundary. Transparency logic 1055 detects the transparent pixel 1112 but makes no detection of a transparent pixel for the case of the 4 consecutive bits 1114 which cross a pixel boundary. Transparency logic 1055 thus generates a transparency mask 1120 having all "1's" for the nontransparent pixels and all "0's" for the transparent pixel 1112. Data word 1130 corresponds to the destination data at the location within video random access memory 132. These three data words 1110, 1120 and 1130 are combined within mask/merge unit 1035 to generate resultant word 1140 which is written into the desired location within video random access memory 132. Note that resultant word 1140 includes N, N+1 and N+3 which are identical to the source pixel 1110. The pixel N+2 corresponds to the prior destination pixel of word 1130. Thus the transparent pixel 1112 within source data word 1110 causes the resultant to be unchanged in that particular pixel.

FIG. 12 illustrates an example of plane masking. FIG. 12 illustrates three data words 1210, 1220 and 1230 each composed of two 8 bit pixels N and N+1. Data word 1210 shows a representation of data read from a particular data word of video random access memory 132. Data word 1220 illustrates an example of a possible plane mask stored in register 950. These plane mask bits may be selected in any desired combination in order to separate differing color values, or control functions of the pixel code. The plane mask shown in 1220 is merely an illustrative example and has no significance otherwise. Mask/merge unit 1035 combines the data words 1210 and 1220 to generate the resultant data word 1230. Note that in each of the pixels N and N+1, the data is "0" where the plane mask 1220 was "0" and that the data equals the corresponding bit from source data 1210 where the plane mask 1220 was "1".

FIG. 13 illustrates an example in which both transparency and plane masking are employed. As before, FIG. 13 illustrates a 16 bit data word divided into a pair of 8 bit pixels N and N+1. Data word 1310 illustrates two pixels of the original data at the destination location which are to be altered. Data word 1320 illustrates two pixels of the source data which is to be moved to the destination location. Note that the three least significant bits of pixel N+1 of source data 1320 are "0's". Data word 1330 illustrates the plane mask selected for this example. This plane mask is recalled from register 950. In this particular example the plane mask illustrated in 1330 disables the five most significant bits and enables the three least significant bits of each pixel. Data word 1340 illustrates the combination of the source data from 1320 and the plane mask from 1330. Note that the five most significant bits of each pixel N and N+1 are "0's" in accordance with plane mask 1330. The three least significant bits of each pixel of 1340 are identical to the three least significant bits of the corresponding pixel of 1320. In the case of pixel N this is "ZZZ". In the case of N+1 this is "000".

Data word 1350 corresponds to the transparency mask generated by transparency logic 1055. Note that pixel N+1 of data word 1340 includes all zeros, which is the transparent code in the preferred embodiment. Therefore, pixel N+1 is all "0's". On the other hand, pixel N of data word 1340 is not all "0's", therefore pixel N of transparency mask 1350 is all "1's". Data word 1360 is the combined plane mask and transparency mask. This data word is generated by an AND operation between plane mask 1330 and transparency mask 1350. Finally, 1370 is the resultant data to be stored in the destination location. Pixel N+1 of the resultant data is identical to the original data illustrated in 1310. The five most significant bits of pixel N are identical to the five most significant bit of pixel N of the original data word 1310. Lastly, the three least significant bits of pixel N of the resultant data 1370 corresponds to the three least significant bits of the pixel N of source data 1320.

Figure 14:
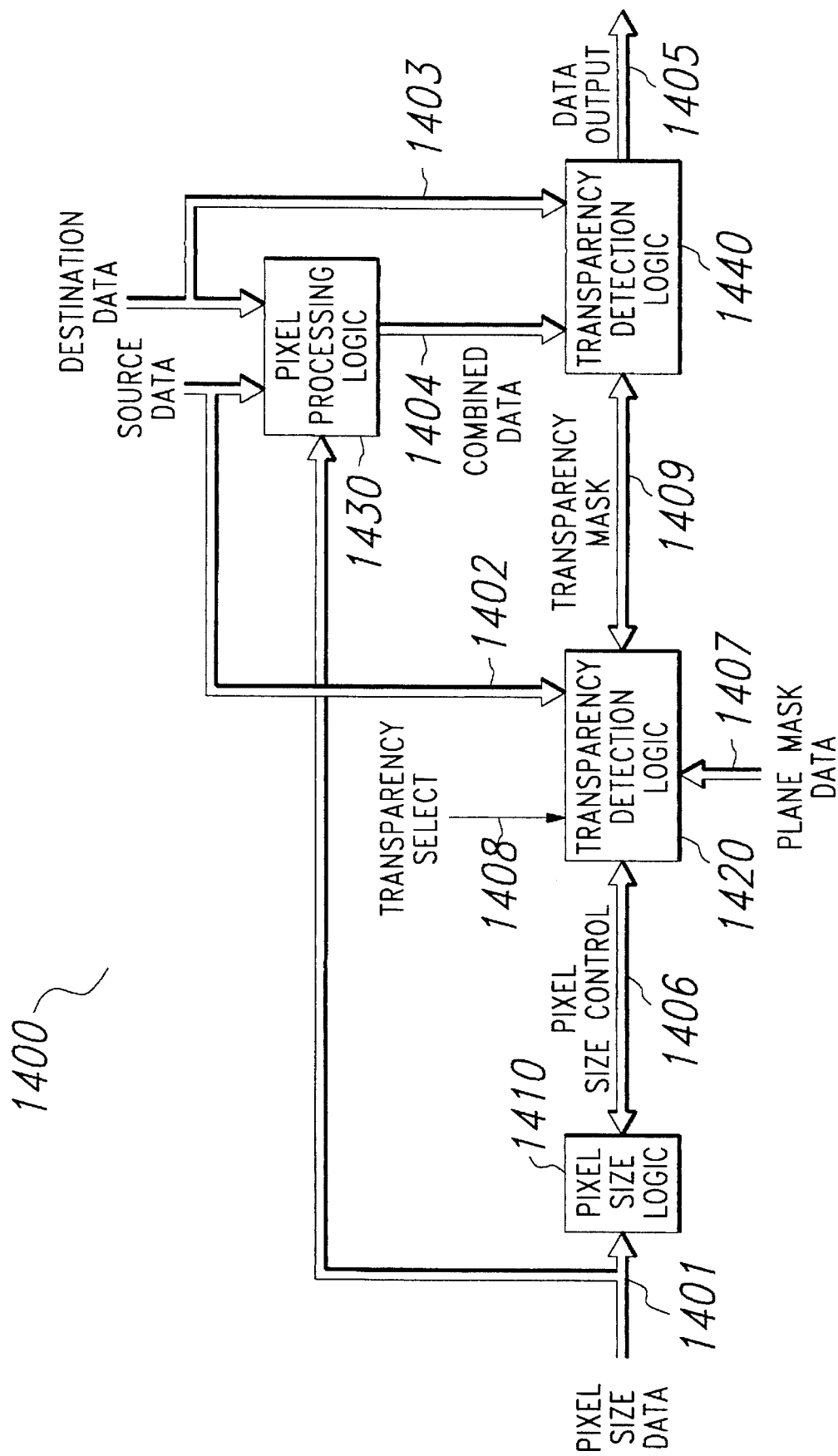
FIG. 14 illustrates details of the hardware employed to implement transparency and plane masking in accordance with the present invention.
Figure 15A:
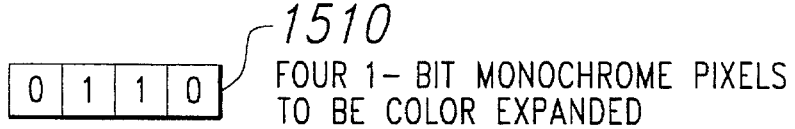
FIG. 15 illustrates an example of color expansion of monochrome pixel data to color pixel data.
Figure 15B:
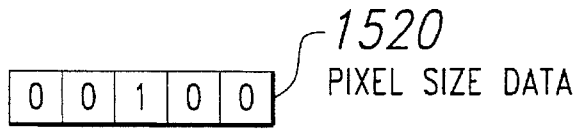
Figure 15C:
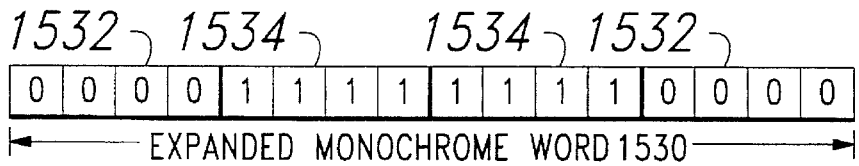
Figure 15D:
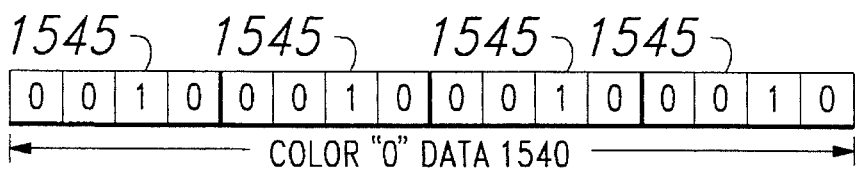
Figure 15E:
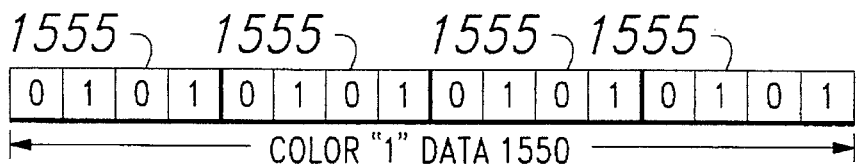
Figure 15F:
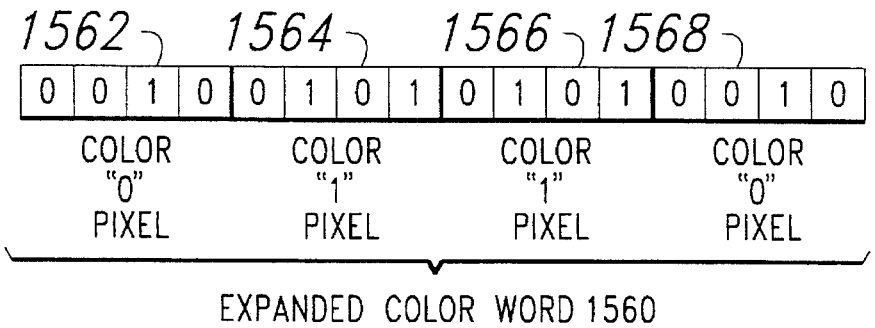

FIG. 14 illustrates the general construction of the transparency apparatus in accordance with the present invention. FIG. 14 illustrates transparency logic 1400 which is a part of special graphics hardware 210. Transparency logic 1400 includes pixel size logic 1410, transparency detection logic 420 and transparency select logic 1440. Transparency logic 1400 is responsive to the combined data on combined data bus 1404 from pixel processing logic 1430. In general, transparency detection logic 1420 detects transparent pixels from the source data on source data bus 1402 and enables transparency select logic 1440 to select, on a bit by bit basis, between the combined data from pixel processing logic 1430 on combined data bus 1404 and the destination data on destination bus 1403. Transparency select logic generates a data output on data output bus 1405 which is written into the destination location in accordance with processing block 807 illustrated in FIG. 8.

Pixel size logic 1410 receives pixel size data on pixel size bus 1401 and generates pixel size control data on pixel size control bus 1406. The pixel size data corresponds to the data stored in register 940 illustrated in FIG. 9. This data is passed to special graphics hardware 210 from input/output registers 260 and is available for use in the special graphics hardware 210. As noted above in conjunction with FIG. 9, the pixel size data stored in register 940 corresponds to the number of bits per pixel of the color codes representing the pixels of the graphics image. In accordance with the preferred environment of the present invention, the pixel size may be either 1, 2, 4, 8 or 16 bits. As illustrated in FIG. 5, this permits an integral number of pixels to be contained within a single 16 bit data word. As a consequence, the pixel size can be represented by a 5 bit number in which only a single of the 5 bits is a "1".

Transparency detection logic 1420 receives inputs from source data bus 1402, pixel size control bus 1406, plane mask data bus 1407 and transparency select line 1408. Transparency detection logic 1420 generates an output on combined mask bus 1409 which indicates bit by bit whether the combined data or the destination data is to selected by transparency select logic 1440. Transparency detection logic 1420 detects transparent pixels from the source data 1402, that is pixels in which all of the bits are "0". Transparency select signal 1408 comes from transparency enable/disable section 912 of register 910 and controls whether transparency is enabled or disabled. The transparency detection is made in conjunction with the plane mask data on plane mask data bus 1407 such that bits which are not enabled by the plane mask are not employed in the detection of transparency. The plane mask data on bus 1407 comes from register 950 illustrated in FIG. 9. This process was described previously in conjunction with FIG. 13.

Referring back to FIG. 14 it is seen that pixel processing logic 1430 is responsive to source data bus 1402, destination data bus 1403 and pixel size data bus 1401. Pixel processing logic 1430 generates an output on combined data bus 1404 for application to transparency select logic 1440. Pixel processing logic 1430 forms some sort of arithmetic or logical combination between the individual pixel data from source data bus 1402 and destination bus 1403. The particular source destination combination is selected by the pixel processing section 916 of register 910 illustrated in FIG. 9. This combined data is then applied to transparency select logic 1440. As noted above transparency select logic 1440 selects between the destination data on bus 1403 and the combined data on bus 1404 on a bit by bit basis dependent upon the corresponding bit of transparency mask bus 1409.

The execution of a color expand operation will now be described in conjunction with FIG. 15. It is advantageous in terms of required memory to store the type fonts for alphanumeric characters and other frequently used symbols such as icons in a monochrome format. This monochrome format will include a single bit per pixel, a "1" indicating a foreground pixel and a "0" indicating a background pixel. At the time any of these arrays is to be displayed, it is moved from its off screen storage location into the portion of video RAM 132 which is displayed. In this operation, the single bit per pixel is expanded to become one of a pair of color codes. This pair of color codes corresponds to the color "0" data stored in register 609 and the color 1 data stored in register 610 of the register files 220. This transformation corresponds conceptually to the attachment of color to the figure at the time of drawing the figure on the screen, thus making these colors an attribute of the array move.

FIG. 15 illustrates an example of such a color expand operation for the case in which the pixel size is four bits. Four bits of monochrome data which are to be expanded into a single 16 bit word of color data are illustrated at 1510. These four bits of monochrome data corresponds to four pixels. The pixel size data is illustrated at 1520. Note that the number indicated at 1520 is four, corresponding to four bits per pixel. While in general the color expand operation operates in conjunction with 16 bit data words in accordance with the preferred embodiment, only the four bits illustrated in 1510 are relevant because these four bits are sufficient to specify an entire 16 bit color word.

The color expand operation of the present invention is executed in two steps. In the first step, monochrome word 1510 is transformed into an expanded monochrome word 1530. Expanded monochrome word 1530 includes four pixels, because pixel size data 1520 indicates four bits per pixel and four of these pixels make an entire 16 bit word. Expanded monochrome data 1530 includes a pair of all "0" pixels 1532 and a pair of all "1" pixels 1534. These "0" and "1" pixels corresponds to the arrangement of "0" and "1" pixels in monochrome data 1510. Note that expanded monochrome word 1530 is formed in conjunction with the number of bits per pixel indicated by pixel size data 1520. Therefore, for example, if pixel size data 1520 had indicated eight bits per pixel then they would only be two pixels within expanded monochrome word 1530.

Data 1540 corresponds to the color 0 data stored in register 609 of the register files and data 1550 corresponds to the color 1 data stored within register 610 of the register files. Note that color 1 data 1540 includes four bit color data 1545 replicated throughout this 16 bit word, in this example four times. Similarly, color 0 data 1550 includes four four-bit pixel values 1555. The color 0 and the color 1 pixel values are replicated throughout the 16 bit words because of the manner in which the expanded color is formed.

Data word 1560 illustrates the expanded data word in accordance with the present example. The expanded data word 1560 includes individual pixel data 1562, 1564, 1566 and 1568. The expanded color word 1560 is formed bit by bit by allowing the state of each bit within expanded monochrome data 1530 to determine whether the data from color 0 word 1540 or from color 1 word 1550 is applied to the expanded color word 1560. Note that pixel value 1562 corresponds to color 0 pixel value 1545 because all of the bits of the corresponding pixel value 1032 are zero. The pixel data 1564 corresponds to the color 1 pixel value 1555 because all of the bits within pixel value 1534 of expanded monochrome word 1530 are ones. The expanded color output is formed bit by bit in order to enable this function to operate for differing pixel sizes.

The windowing technique of the present invention involves a number of comparisons. In accordance with the preferred embodiment, the location of the pixel to be considered is expressed in the X Y addressing mode. In accordance with the preferred embodiment, the address of the pixel in question, the window start location and the window end location are all expressed as 32 bit digital numbers, with the most significant 16 bits corresponding to the Y coordinate and the least significant 16 bits corresponding to the X coordinate. In order to perform the windowing technique of the present invention using this preferred embodiment for the data types, it is necessary to make rapid comparisons of 16 bit digital numbers corresponding to coordinate values.

Figures 16, 17:
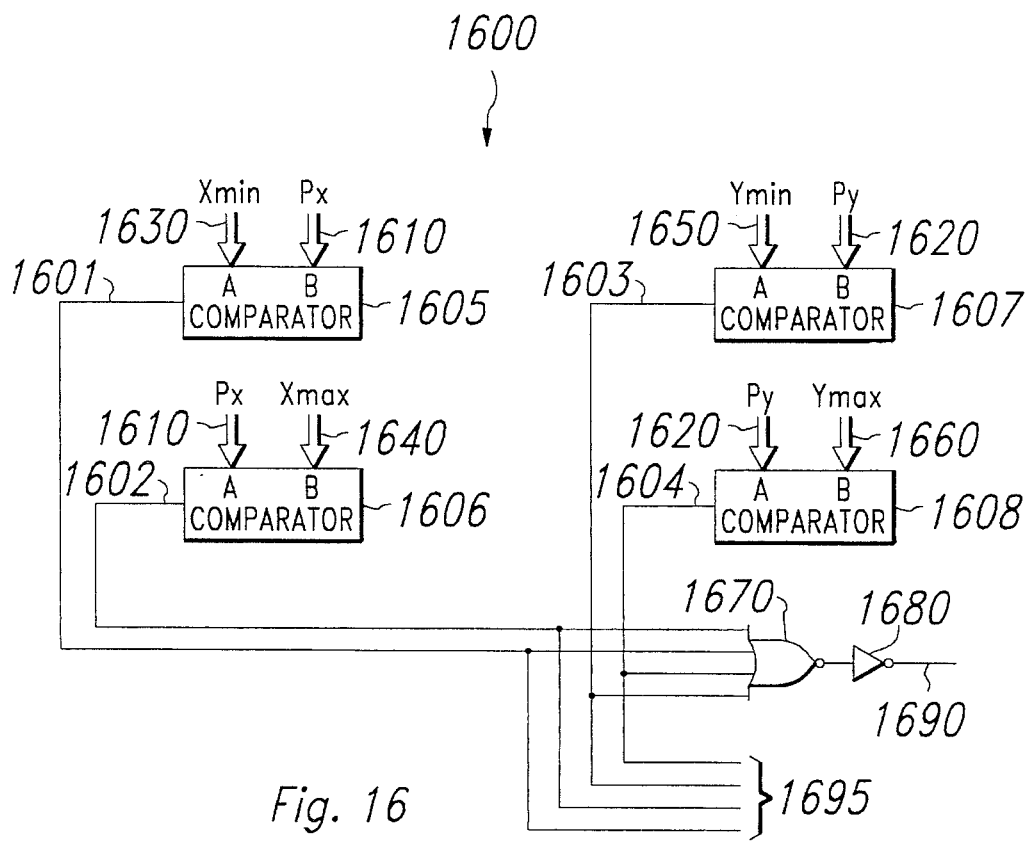
FIG. 16 illustrates the hardware for implementing a windowing operation.
FIG. 17 illustrates the relationship between the window detector output and the location of the pixel tested in relation to the defined window.

FIG. 16 illustrates a window checking circuit 1600 including four comparators 1605–1608 which can test to determine whether the X and Y coordinates of a pixel place it within the desired window. A first of the comparators 1605 receives as its A input the X coordinate of the window start ($X_{MIN}$) on bus 1630. As its B input, it receives the X coordinate of the pixel ($P_X$) on bus 1610. This comparator 1605 generates an output on output line 1601 which has a "1" value if the X coordinate of the window start ($X_{MIN}$) is greater than the X coordinate of the pixel ($P_X$). A second comparator 1606 generates an output on output line 1602. This second comparator 1606 receives as its A input the X coordinate of the pixel ($P_X$) on bus 1610. It receives as its B input the X coordinate of the window end ($X_{MAX}$) on bus 1640. An output is generated on output line 1602 having a value "1" if the X coordinate of the pixel ($P_X$) is greater than the X coordinate of the window end ($X_{MAX}$). The third comparator 1607 generates an output on output line 1603. This comparator receives as its A input the Y coordinates of the window beginning point ($Y_{MIN}$) on bus 1650. It receives as its B input the Y coordinates of the pixel ($P_Y$) on bus 1620. The third comparator 1607 generates a "1" on line 1603 if the Y coordinate of the window beginning point ($Y_{MIN}$) is greater than the Y coordinate of the pixel ($P_Y$). Lastly, the fourth comparator 1607 generates its output on output line 1604. This last comparator receives as its A input the Y coordinates of the pixel ($P_Y$) on bus 1620. It receives as its B input the Y coordinates of the window end point ($Y_{MAX}$) on bus 1607. The fourth comparator 1600 generates a "1" on line 1604 if the Y coordinate of the pixel ($P_Y$) is greater than the Y coordinate of the window end ($Y_{MAX}$).

The window comparison circuit 1600 illustrated in FIG. 16 generates two types of outputs. The first output is a window violation signal issued at output line 1690. The output lines 1601, 1602, 1603 and 1604 from each of the comparator circuits 1605–1608 are applied as inputs to a NOR circuit 1670. The output of NOR circuit 1670 is applied to inverter 1680 which generates the output signal on output line 1690. This combination is effectively an OR circuit. The output on output line 1601 is a "1" if $X_{MIN}$ is greater than $P_X$. The output on output line 1602 is a "1" if $P_X$ is greater than $X_{MAX}$. The output on output line 1603 is a "1" if $Y_{MIN}$ is greater than $P_Y$. Lastly, the output on output line 1604 is a "1" if $P_Y$ is greater than $Y_{MAX}$. These conditions set forth the four boundaries of the rectangular window. Thus if any of the output lines 1601 1602, 1603 or 1604 is "1", then the coordinates of the pixel in question are outside the window. In such an event, that is if any of these outputs are "1", then the pixel in question lies outside the window. In such a case, inverter 1680 generates a "1" output on output line 1690. Note that the output line 1690 is connected to set or clear a violation/overflow bit for instructions in which windowing is employed. Thus this violation/overflow bit is set if the pixel location is outside the defined window.

The window checking circuit generates a second output on bus 1695. Bus 1695 is directly connected to the output lines 1601, 1602, 1603 and 1604 from the four comparator circuits 1600. The output on bus 695 is an indication of the relationship between the pixel coordinates and the window. Each bit within bus 1695 indicates the relationship of the pixel coordinates to one of the window limits. Together these four bits indicate which of nine regions the pixel coordinates are in in relationship to the defined window.

FIG. 17 illustrates the relationship between the four bits generated and the defined window. FIG. 17 illustrates window 1700 together with regions 1701 to 1708 which surround this window. FIG. 17 also illustrates the window start point 1710 having the coordinates ($X_{MIN}$, $Y_{MAX}$) and the window end point 1720 having the coordinates ($X_{MAX}$, $Y_{MAX}$). Each of these regions includes a four bit code corresponds to the output on bus 1695. The first bit corresponds to the output 1604, the second bit corresponds to the output 1603, the third bit corresponds to 1602 and the fourth bit corresponds to 1601. Note that in region 1700, the window region, the four bits are "0000". In accordance with the preferred embodiment, when the coordinates of a pixel are tested against the window limits, the four bits from bus 1695, as illustrated in FIG. 17, are stored within a specified register in register files 220. In this way the outputs for several pixels may be stored and later employed for graphics manipulation. In particular, this instruction may be used to trivially reject lines which do not intersect the window. These codes generated for two separate pixels which define the line are AND'ed together. If the result is nonzero, then the line must lie completely outside the window. A zero result indicates that the line may cross the window, therefore a more rigorous test must be applied to determine whether this line crosses the window.

FIGS. 18 to 22 illustrate diagramatically the manner of operation of various instructions in the X Y coordinate mode. FIG. 18 illustrates the operation of register addition in the X Y coordinate mode. FIG. 19 illustrates the operation of register subtraction in the X Y coordinate mode. FIG. 20 illustrates the manner of execution of a register compare instruction which separately compares the X and Y coordinates. FIG. 21 illustrates the operation of a move X coordinate instruction. Lastly, FIG. 22 illustrates the operation of a move Y coordinate instruction. Note that in each of the instruction operations illustrated in FIGS. 18 to 22 the instruction itself includes register fields which specify which of the plurality of registers included within register files 220 is the source register and which is the destination register.

As noted in the illustrations in FIGS. 18 to 22, the separate X and Y coordinates of the address of a particular pixel are stored in a single register. The X coordinate occupies the least significant bits of that register and the Y coordinate occupies the most significant bits. In accordance with the preferred embodiment, each register within register files 220 includes 32 bits. Also in accordance with the preferred embodiment the Y coordinate occupies the 16 most significant bits and X coordinate occupies the 16 least significant bits.

FIG. 18 illustrates the operation of addition of registers in the X Y coordinate mode. Registers 1810 and 1820 illustrate the state prior to the operation. Register 1810 includes Y coordinate 1811 and X coordinate 1812. Similarly, register 1820 includes Y coordinate 1821 and X coordinate 1822. As noted above, in the preferred embodiment, the Y coordinate of each register 1810 and 1820 occupies the 16 most significant bits and the X coordinate occupies the 16 least significant bits. The resultant is illustrated at 1830 which includes Y coordinate 1831 and X coordinate 1832. The Y coordinate 1831 is the sum of Y coordinate 1811 and Y coordinate 1821. In like manner, X coordinate 1832 is the sum of X coordinate 1812 and X coordinate 1822. In accordance with the preferred embodiment, this resultant 1830 is stored in the destination register 1820 replacing the original contents, as illustrated diagrammatically in FIG. 18. By this means the operation occupies only two of the registers of register files 220. This addition of the X and Y coordinates occurs completely independently. It should be noted that although the most significant bit of the X coordinate 1832 is adjacent to the least significant bit of the Y coordinate 1831, any carry generated by the X sum does not propagate to the least significant bit of the Y coordinate.

FIG. 19 illustrates the operation of subtraction of registers in the X Y coordinate mode. At the beginning of this operation register 1910 includes Y coordinate 1911 and X coordinate 1912. Likewise, register 1920 includes Y coordinate 1921 and X coordinate 1922. The resultant of this operation is illustrated at 1930. The Y coordinate 1931 is the difference of the Y coordinate 1921 and the Y coordinate 1911. In the same manner, the X coordinate 1932 is a difference of X coordinate 1922 and X coordinate 1912. As in the case of the register addition instruction illustrated in FIG. 18, this resultant 1930 may be stored in the destination register replacing the previous contents, thereby employing only two registers for this instruction.

FIG. 20 illustrates the operation of the register compare instruction in the X Y coordinate mode. The register compare instruction in the X Y coordinate mode begins like a register subtract instruction as illustrated in FIG. 19. The data in register 2010, including Y coordinate 2011 and X coordinate 2012, is subtracted from the data stored in register 2020, which includes Y coordinate 2021 and X coordinate 2022. The resultant data 2030 includes a Y coordinate 2031 which is a difference of the Y coordinates of the operands and has an X coordinate 2032 which is the difference between the X coordinates of the operands. Rather than storing this difference data in a register, as in the case of the subtract register in X Y coordinate mode instruction illustrated in FIG. 19, this data is used to set bits in the status register 2040.

Status register 2040 includes zero bit 2041, carry bit 2042, negative bit 2043 and overflow bit 2044. These bits are set or cleared based upon various comparisons made for particular instructions executed by central processing unit 200. In the case of the compare register in X Y coordinate mode instruction, the zero bit 2041 indicates whether the Y coordinate difference is 0. The carry bit 2042 indicates whether the Y coordinate difference is negative. Likewise, the negative bit 2043 indicates whether or not the X coordinate difference is 0. Lastly, the overflow bit 2044 indicates whether or not the X coordinate difference is negative. These various comparisons outputs come from the outputs of the arithmetic logic unit which performs these subtractions. The resultant data 2030 is not stored in any register, and the operand data from the registers 2010 and 2020 is unchanged.

FIG. 21 illustrates the operation of a move X coordinate instruction. As before the operation is begun with a source register 2110 having a Y coordinate of 2111 and X coordinate 2112 and destination register 2120 have a Y coordinate 2121 and a X coordinate 2122. In this case the resultant 2130 includes a Y coordinate 2131 identical to the destination Y coordinate 2121 and a X coordinate 2132 identical X coordinate of the source 2112. This operation is conceptually the movement of the X coordinate 2013 of the source register into the destination register. As before in the case of the add register instruction and the subtract register instruction, in the preferred embodiment the resultant data 2130 is stored in the destination register 2120.

FIG. 22 illustrates the operation of the move Y coordinate instruction. This instruction is similar to the move X coordinate instruction illustrated in FIG. 21 except that the coordinates are reversed. Source register 2210 includes Y coordinate 2211 and X coordinate 2212. Destination register 2220 includes Y coordinate 2221 and X coordinate 2222. After the move Y instruction the resultant data 2230 includes Y coordinate 2231 identical to the Y coordinate 2211 of the source register and X coordinate 2232 identical to the X coordinate 2222 of the destination register. This can be conceptualized as moving the Y coordinate of the source register into the destination register. As in the cases stated above, in the preferred embodiment the resultant data 2140 is stored in the destination register 2220.

FIG. 23 illustrates the operation of a draw and advance instruction. In accordance with the draw and advance instruction, a predetermined color is written into a pixel within video random access memory 132 and an address is updated. FIG. 23 illustrates base coordinate register 2310 having a base Y coordinate 2311 and base X coordinate 2312. Together these X and Y coordinates designate the address of an individual pixel 2340 within video random access memory 132. FIG. 23 further illustrates offset register 2320 having an offset Y coordinate 2321 and an offset X coordinate 2322. In manner similar to that illustrated in the addition of registers in the X Y coordinate mode appearing in FIG. 18, a resultant is formed from the sum of the respective X and Y coordinates of the registers 2310 and 2320. This resultant 2330 includes a Y coordinate 2331 which is the sum of the base Y coordinate and the offset Y coordinate an X coordinate 2332 which is the sum of the base X coordinate and the offset X coordinate. This resultant is stored back in the register 2310 as the updated base coordinates. Note that in this instruction operation the instruction itself includes register fields which specify which of the plurality of registers included within register files 220 is the base register and which is the offset register.

At the same time as this register addition occurs, a pixel operation also occurs. The individual pixel 2340 stored at the address corresponding to the base coordinates of register 2310 is recalled and becomes recalled pixel 2341. In accordance with the pixel processing option selected by the pixel processing bits 916 of control register 910, this recalled pixel 2341 is combined with the color 0 pixel stored in register 609 thereby generating a combined pixel 2342. This combined pixel 2342 is written into the address specified by the initial value of register 2310 replacing pixel 2340. This pixel processing operation occurs substantially simultaneously with the register addition operation. These operations can occur substantially simultaneously because of parallel hardware provided within central processing unit 200 and special graphics hardware 210.

Figure 24:
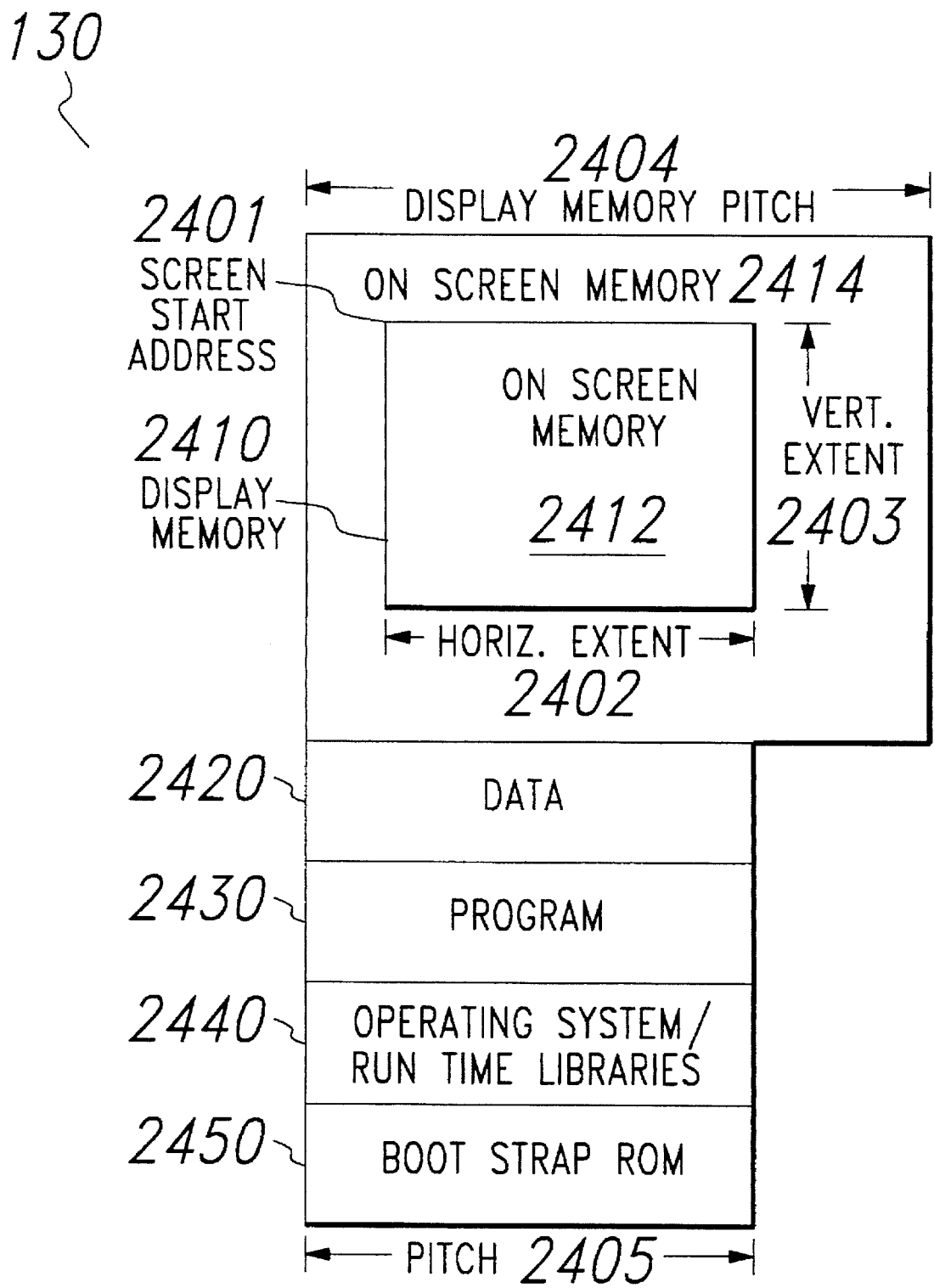
FIG. 24 illustrates an example of a memory map for the graphics processor of the present invention.

FIG. 24 illustrates a typical memory map of memory 130 of the graphics data processing system 100. It should be understood that the memory map illustrated in FIG. 24 is merely illustrative of the type of memory allocation possible in accordance with this invention and should not be taken as limiting any region illustrated to any specific portion of the address space. Memory 130 illustrated in FIG. 24 includes display memory 2410, data memory 2420, program memory 2430, operations system/run time libraries memory 2440 and boot strap read only memory (ROM) 2450.

Display memory 2410 includes two parts. These parts are the on screen memory 2412 and off screen memory 2414. All of display memory 2410 is organized with a pitch of 2404. This pitch 2404 is the difference in memory address between vertically adjacent pixels. The location and extent of on screen memory 2412 is defined by screen start address 2401, horizontal extent 2402 and vertical extent 2403. The on screen memory 2412 includes the bit map which is periodically output to shift register 140 in order to define the output of video display 170. Off screen memory 2414 is of the same pitch as on screen memory 2412. For this reason this area of memory can be advantageously used for storage of bit map data which may need to be quickly displayed, such as text and graphics data for the background of windows. This region could also be used for other types of data and even program code, however such data would be meaningless if displayed.

Data memory 2420, as well as the other memory illustrated in FIG. 24, has a pitch of 2405 which is different than display memory 2410. In actual fact unless there is pixel data corresponding to bit mapped graphics in these regions the concept of pitch is meaningless. In any event, data memory 2420 typically has a differing organization than display memory 2410. In the example illustrated in FIG. 24, data memory 2420 could be used for any data employed by the program executed by graphics processor 120.

Program memory 2430 stores programs for execution by graphics processor 120. Central processing unit 200 includes the capability of performing general purpose data processing, including instruction flow control, under the control of a program of instructions stored in program memory 2430. In addition, as shown in FIG. 10, special graphics hardware 210 is also controlled by instructions stored in program memory 2430. In this regard no distinction is made between general purpose instructions and graphics instructions stored in program memory 2430. These two types of instructions can occupy the same type of memory space and are only distinguished by the exact operation performed when entered into instruction register 1060. Thus the graphics processor 120 is capable of executing programs containing both general purpose instructions (such as register arithmetic and logical operations, memory access operations and program flow control operations like conditional and unconditional branches and subroutine calls and returns) and graphics instructions (such as pixel array transfers with pixel processing, transparency and plane masking).

In accordance with principles well known in the computer art, the program instructions stored in program memory 2430 could be written in a high level language. The only requirement for implementing such a high level language is the provision of a suitable compiler or interpreter to convert the high level language program into the instructions executable by entry into instruction register 1060. The capability of execution of general purpose program flow instructions by graphics processor 120 is critical to this capability. In particular, it is considered advantageous in the preferred embodiment to provide a compiler for the C language in order to enable easier program development than possible if no high level language were provided.

Operating system/run time libraries memory 2440 stores important program instructions for fundamental operations of graphics processor 120. The operating system enables many often used functions to be stored only once without repetition. These fundamental instructions could involve the manner in which the data processing system is initialized upon initial application of power or reset, the standard manner of interface between graphics processor 120 and host processing system 110, the initial screen limits and such. In addition other functions or an intermediate level between the operating system and the application program are provided in run time libraries. These functions could include standard input and output routines, standard color codes for loading into video palette 150, standard programs for performing windowing operations with on screen memory 2411 and off screen memory 2412 and such. These run time libraries would be more closely tied to particular applications than the operating system but still applicable to a variety of applications.

The most fundamental portion of memory 130 is boot strap read only memory 2450. This is the only portion of the memory which must at least have some portion at a fixed memory address. Upon initial application of power or upon reset, the program counter 1015 of central processing unit 200 is set to a fixed address. This address must be the starting address of the program stored in boot strap read only memory 2450. It is this memory that enables the graphics processor 120 to be initialized and responsive to inputs. In typical application, only boot strap read only memory 2450 would be stored in read only memory. All other parts of the memory 130 would either be loaded into memory 130 by an input device or loaded from host processing system 110. The instructions stored in boot strap read only memory 2450 enables this initialization.

The provision of such a flexible and programmable architecture permits the graphics data processor of the present invention to be more widely applicable than the prior art hardwired graphics controller. The graphics processor can be programmed to be a simple display list interpreter under the strict control of a host data processing system. On the other hand the graphics processor can be programmed to perform more complex operations such as conic section line drawing. In this regard the graphics processor is superior to the prior art hardwired graphics controllers which also provide line drawing functions. Firstly, with the provision of general purpose instructions the graphics processor can calculate its own parameters without the need to be fed these parameters from the host data processing system. In addition, the general programmability of the graphics data processor enables differing algorithms to be employed for different applications. It is foreseeable that certain applications would prefer the fastest possible drawing speed while other applications would prefer the smoothest possible line or that differing anti-aliasing techniques would be desirable for differing applications. With a hardwired graphics controller the drawing algorithm is fixed without the possibility of special adaption to a particular problem. With the basic parallelism of the structure illustrated in FIG. 10 the general programmability feature may be achieved without sacrifice of the speed of a hardwired graphics controller.

We claim:

1. A graphics display system comprising:
   a. memory circuits for storage of graphics data defining a visual image, the graphics data being formed of pixel codes representing each pixel of the visual image, the pixel codes being arranged in graphics data words and each graphics data word including plural pixels, and the memory circuits for storage of a plurality of program instructions providing for both arithmetic and logic operations and graphics operations on the graphics data, the memory circuits including a multi-bit serial output adapted to be connected to a user viewable display; and
   b. graphics processor circuits connected to the memory circuits and including:
      i. a central processing unit that includes a program counter for sequentially addressing the program instructions from the memory circuits, an instruction register for storing each program instruction addressed by the program counter and control circuits connected to and decoding the program instruction stored in the instruction register, the control circuits producing control signals on control bus leads in response to each program instruction stored in the instruction register, the central processing unit being connected to the control bus leads and operating in response to the control signals to perform arithmetic and logic operations on the graphics data, and
      ii. graphics circuits connected to the control bus leads and operating in conjunction with the central processing unit in response to the control signals to perform graphics operations on the graphics data, and the graphics circuits operating on plural pixels in parallel.

2. The graphics display system of claim 1 including a user viewable display connected to the memory circuits for generating the visual image from at least part of the graphics data, the pixels of the visual image having visual attributes represented by the pixel codes of the graphics data.

3. The graphics display system of claim 1 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array and destination array in the graphics data in the memory circuits, to combine corresponding pixel codes from the source array and the destination array in accordance with the specified graphics operation, and to write the combined pixel codes in corresponding locations of the destination array.

4. The graphics display system of claim 1 in which the graphics processor circuits include:
   a pixel size register for storing pixel size data indicating the data length of the pixel codes stored in the first portion of the memory; and
   the graphics circuits are connected to the pixel size register for performing the graphics operations in accordance with the pixel size data contained in the pixel size register.

5. The graphics display system of claim 1 in which:
   the memory circuits are organized into data words having a certain length, each graphics data word including an integral number of pixel codes; and
   the graphics processor circuits operate in response to the instructions to read whole data words from the memory circuits and write whole data words into the memory circuits with the graphics circuits operating upon whole data words of the certain length and the integral number of pixel codes simultaneously.

6. A graphics display processor for processing graphics data stored in memory circuits in accordance with program instructions also stored in the memory circuits, the graphics data being formed of pixel codes representing each pixel of the visual image, the pixels being arranged in graphics data words and each graphics data word including plural pixels, the program instructions providing for both arithmetic and logic operations and graphics operations, the processor comprising:
   a. a central processing unit that includes a program counter for sequentially addressing the program instructions from the memory circuits, an instruction register for storing each program instruction addressed by the program counter and control circuits connected to and decoding the program instruction stored in the instruction register, the control circuits producing control signals on control bus leads in response to each program instruction stored in the instruction register, the central processing unit being connected to the control bus leads and operating in response to the control signals to perform arithmetic and logic operations on the graphics data, and
   b. graphics circuits connected to the control bus leads and operating in conjunction with the central processing unit in response to the control signals to perform graphics operations on the graphics data, the graphics circuits operating on plural pixels in parallel.

7. The graphics display processor of claim 6 including a user viewable display connected to the memory circuits for generating a visual image from at least part of the graphics data.

8. The graphics display processor of claim 6 in which the graphics data is formed by pixel codes, and at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array and destination array in the graphics data in the memory, to combine corresponding pixel codes from the source array and the destination array in accordance with the specified graphics operation, and to write the combined pixel codes in corresponding locations of the destination array.

9. The graphics display processor of claim 6 in which the graphics data is formed by pixel codes, and including:

a pixel size register for storing pixel size data indicating the data length of the pixel codes stored in the memory; and the graphics circuits are connected to the pixel size register for performing the graphics operations in accordance with the pixel size data contained in the pixel size register.

10. The graphics display processor of claim 6 in which:

the memory is organized into data words having a certain length, each graphics data word including an integral number of pixel codes; and the central processing unit operates in response to the instructions to read whole data words from the memory and write whole data words into the memory with the graphics circuits operating upon whole data words of the certain length and the integral number of pixel codes simultaneously.

11. A graphics display system comprising:

a. a host processing system including at least one processor, read only memory, random access memory and peripheral devices, the host processing system providing electrical signals on a host bus representing host data formed of pixel codes and program instructions for processing the host data to determine the content of a visual image to be displayed;

b. graphics memory circuits for storing display data, which are formed of pixel codes and which represent the visual image to be displayed, and for storing the host data and the program instructions, the host and display data being represented by pixel codes, the host and display data being formed of pixel codes representing each pixel of the visual image, the pixels being arranged in data words and each data word including plural pixels, the program instructions providing for both arithmetic and logic operations and graphics operations on the host and display data;

c. video display circuits connected to the graphics memory circuits, the video display circuits for forming the visual image in response to receipt of the display data from the graphics memory circuits; and d. graphics processor circuits including:

i. a central processing unit including a program counter addressing sequential program instructions in the memory circuits, an instruction register for storing each program instruction addressed by the program counter and control circuits connected to and decoding the program instruction stored in the instruction register, the control circuits producing control signals on control bus leads in response to each addressed program instruction stored in the instruction register, the central processing unit being connected to the control bus leads and operating in response to the control signals to perform arithmetic and logic operations on the host and display data; and ii. graphics circuits connected to the control bus leads and operating in conjunction with the central processing unit in response to the control signals to perform graphics operations on the host and display data, and the graphics circuits operating on plural pixels in parallel.

12. The graphics display system of claim 11 including a user viewable display connected to the memory circuits for generating the visual image from at least part of the display data, the pixels of the visual image having visual attributes represented by the pixel codes of the display data.

13. The graphics display system of claim 11 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array in the host data and a display array in the display data, to combine corresponding pixel codes from the source and the destination arrays in accordance with the specified graphics operation, and to write the combined pixel codes in corresponding locations of the display array.

14. The graphics display system of claim 11 in which the graphics processor circuits include:

a pixel size register for storing pixel size data indicating the data length of the pixel codes stored in the graphics data; and the graphics circuits are connected to the pixel size register for performing the graphics operations in accordance with the pixel size data contained in the pixel size register.

15. The graphics display system of claim 11 in which:

the memory circuits are organized into data words having a certain length, each graphics data word including an integral number of pixel codes; and the graphics processor circuits operate in response to the instructions to read whole data words from the memory circuits and write whole data words into the memory circuits with the graphics circuits operating upon whole data words of the certain length and the integral number of pixel codes simultaneously.

16. A graphics display system comprising:

a. graphics memory circuits including random access memory for storing graphics data including source data and bit mapped display data signals in the form of pixel codes representing a visual image, the pixels being arranged in data words and each data word including plural pixels, the graphics memory circuits also for storing program instruction signals providing for both arithmetic and logic operations and graphics operations on the source data and the display data;

b. video display circuits connected to the random access memory and forming the visual image in response to receipt of the display data; and c. graphics processor circuits including:

i. a central processing unit including a program counter addressing sequential program instructions from the memory circuits, an instruction register for storing each program instruction addressed by the program counter and control circuits connected to and decoding the program instruction stored in the instruction register, the control circuits producing control signals on control bus leads in response to each addressed program instruction stored in the instruction register, the central processing unit being connected to the control bus leads and operating in response to the control signals to perform arithmetic and logic operations on the source and display data; and ii. graphics circuits connected to the control bus leads and operating in conjunction with the central processing unit in response to the control signals to perform graphics operations on the source and display data, and the graphics circuits operating on plural pixels in parallel.

17. The graphics display system of claim 16 including a user viewable display connected to the memory circuits for generating the visual image from at least part of the display data, the pixels of the visual image having visual attributes represented by the pixel codes of the display data.

18. The graphics display system of claim 16 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source and display array in the graphics data, to combine corresponding pixel codes from the source and the destination arrays in accordance with the specified graphics operation, and to write the combined pixel codes in corresponding locations of the display array.

19. The graphics display system of claim 16 in which the graphics processor circuits include:

a pixel size register for storing pixel size data indicating the data length of the pixel codes stored in the graphics data; and the graphics circuits are connected to the pixel size register for performing the graphics operations in accordance with the pixel size data contained in the pixel size register.

20. The graphics display system of claim 16 in which:

the memory circuits are organized into data words having a certain length, each graphics data word including an integral number of pixel codes; and the graphics processor circuits operate in response to the instructions to read whole data words from the memory circuits and write whole data words into the memory circuits with the graphics circuits operating upon whole data words of the certain length and the integral number of pixel codes simultaneously.

21. A graphics display system comprising:

a. host processing system terminals adapted for connection to a host processing system that determines the content of a visual display to be presented to a user by supplying program instructions and host data;

b. graphics memory circuits for storing the program instructions and the host data, and storing display data in the form of bit mapped display data signals representing the visual image, the host data and display data being represented in the form of pixel codes representing each pixel of the visual image, the pixels being arranged in graphics data words and each graphics data word including plural pixels, the program instructions providing for both arithmetic and logic operations and graphics operations on the host and display data;

c. graphics processor circuits including:

i. a central processing unit including a program counter addressing sequential program instructions from the memory circuits, an instruction register for storing each program instruction addressed by the program counter and control circuits connected to and decoding the program instruction stored in the instruction register, the control circuits producing control signals on control bus leads in response to each addressed program instruction stored in the instruction register, the central processing unit being connected to the control bus leads and operating in response to the control signals to perform arithmetic and logic operations on the host and display data; and ii. graphics circuits connected to the control bus leads and operating in conjunction with the central processing unit in response to the control signals to perform graphics operations on the host and display data, and the graphics circuits operating on plural pixels in parallel;

d. video palette circuits coupled to the graphics memory circuits and operating to convert the bit mapped display data signals to video level output signals;

f. converter signals connected to the video palette circuits for converting the video level output circuits to video image signals; and e. video connector terminals adapted for connection of the video image signals to a video display that presents a visual image to a user in response to received video image signals.

22. The graphics display system of claim 21 including a user viewable video display connected to the video connector terminals for generating the visual image from at least part of the display data, the pixels of the visual image having visual attributes represented by the pixel codes of the display data.

23. The graphics display system of claim 21 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array in the host data and a display array in the display data, to combine corresponding pixel codes from the source and the display arrays in accordance with the specified graphics operation, and to write the combined pixel codes in corresponding locations of the display array.

24. The graphics display system of claim 21 in which the graphics processor circuits includes:

a pixel size register for storing pixel size data indicating the data length of the pixel codes stored in the graphics data; and the graphics circuits are connected to the pixel size register for performing the graphics operations in accordance with the pixel size data contained in the pixel size register.

25. The graphics display system of claim 21 in which:

the memory circuits are organized into data words having a certain length, each graphics data word including an integral number of pixel codes; and the graphics processor circuits operate in response to the instructions to read whole data words from the memory circuits and write whole data words into the memory circuits with the graphics circuits operating upon whole data words of the certain length and the integral number of pixel codes simultaneously.

26. A graphics display system comprising:

a. a display generating a visual image for presentation to a user in response to receiving display data signals;

b. memory circuits for storing host data and the display data and for storing program instruction signals used for executing both arithmetic and logic operations and graphics operations on the host data and the display data, the memory circuits producing the display data signals from the display data, the host data and the display data being represented in the form of pixel codes representing each pixel of the visual image, the pixels being arranged in graphics data words and each graphics data word including plural pixels;

c. graphics processor circuits including:

i. a central processing unit including a program counter addressing sequential program instructions from the memory circuits, an instruction register for storing each program instruction addressed by the program counter and control circuits connected to and decoding the program instruction stored in the instruction register, the control circuits producing control signals on control bus leads in response to each addressed program instruction stored in the instruction register, the central processing unit being connected to the control bus leads and operating in response to the control signals to perform arithmetic and logic operations on the host and display data; and ii. graphics circuits connected to the control bus leads and operating in conjunction with the central processing unit in response to the control signals to perform graphics operations on the host and display data, and the graphics circuits operating on plural pixels in parallel; and d. a host system determining the content of the visual image by placing the host data in the memory circuits.

27. The graphics display system of claim 26 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array in the host data and a display array in the display data, to combine corresponding pixel codes from the source and the display arrays in accordance with the specified graphics operation, and to write the combined pixel codes in corresponding locations of the display array.

28. The graphics display system of claim 26 in which the graphics processor circuits includes:

a pixel size register for storing pixel size data indicating the data length of the pixel codes stored in the graphics data; and the graphics circuits are connected to the pixel size register for performing the graphics operations in accordance with the pixel size data contained in the pixel size register.

29. The graphics display system of claim 26 in which:

the memory circuits are organized into data words having a certain length, each graphics data word including an integral number of pixel codes; and the graphics processor circuits operate in response to the instructions to read whole data words from the memory circuits and write whole data words into the memory circuits with the graphics circuits operating upon whole data words of the certain length and the integral number of pixel codes simultaneously.

30. A graphics display processor comprising:

a. host interface circuits adapted to control communication with a host processing system furnishing host data and program instructions;

b. memory interface circuits adapted to control communication of data and instructions with memory circuits that store display data, the program instructions and the host data, the host data and the display data being represented in the form of pixel codes representing each pixel of the visual image, the pixels being arranged in graphics data words and each graphics data word including plural pixels, the program instructions providing for both arithmetic and logic operations and graphics operations on the host and display data;

c. a central processing unit that includes a program counter for sequentially addressing the program instructions from the memory circuits, an instruction register for storing each program instruction addressed by the program counter and control circuits connected to and decoding the program instruction stored in the instruction register, the control circuits producing control signals on control bus leads in response to each program instruction stored in the instruction register, the central processing unit being connected to the control bus leads and operating in response to the control signals to perform arithmetic and logic operations on the host data and display data; and d. graphics circuits connected to the control bus leads and operating in conjunction with the central processing unit in response to the control signals to perform graphics operations on the host data and display data, the graphics circuits operating on plural pixels in parallel.

31. The graphics display processor of claim 30 including a user viewable display connected to the memory circuits for generating the visual image from at least part of the display data, the pixels of the visual image having visual attributes represented by the pixel codes of the display data.

32. The graphics display processor of claim 30 in which at least one of the program instructions includes a pixel array move instruction specifying a graphics operation; and the control circuits include a read only memory storing and producing control signals to the central processing unit and to the graphics circuits in response to the array move instruction to address corresponding pixel codes from a source array in the host data and a display array in the display data, to combine corresponding pixel codes from the source array and the display array in accordance with the specified graphics operation, and to write the combined pixel codes in corresponding locations of the display array.

33. The graphics display processor of claim 30 including:

a pixel size register for storing pixel size data indicating the data length of the pixel codes stored in the memory circuits; and the graphics circuits are connected to the pixel size register for performing the graphics operations in accordance with the pixel size data contained in the pixel size register.

34. The graphics display processor of claim 30 in which:

the memory circuits are organized into data words having a certain length, each graphics data word including an integral number of pixel codes; and the central processing unit operates in response to the instructions to read whole data words from the memory circuits and write whole data words into the memory circuits with the graphics circuits operating upon whole data words of the certain length and the integral number of pixel codes simultaneously.

35. A method of processing graphics data formed of pixel codes representing each pixel of a visual image, the pixels being arranged in graphics data words and each graphics data word including plural pixels, comprising:

a. addressing memory circuits by incrementing a program counter to access sequential program instructions used to execute both arithmetic and logic operations and graphics operations on the graphics data;

b. providing control circuits that decode program instructions to produce respective control signals;

c. applying the accessed program instructions to the control circuits;

d. producing control signals from the control circuits in response to each program instruction applied to the control circuits;

e. performing arithmetic and logic operations on the graphics data in response to the control signals; and f. performing special graphics operations on plural pixels in parallel in the graphics data in conjunction with the performing arithmetic and logic operations.

* * * * *